United States Patent
Luo et al.

(10) Patent No.: US 7,174,331 B1
(45) Date of Patent: *Feb. 6, 2007

(54) LOCKING MECHANISM FOR VIEWS ASSOCIATED WITH B-TREE INDEXES

(75) Inventors: Gang Luo, Madison, WI (US); Michael W. Watzke, Madison, WI (US); Curt J. Ellmann, Madison, WI (US); Jeffrey F. Naughton, Madison, WI (US)

(73) Assignee: NCR Corp., Dayton, OH (US)

( * ) Notice: Subject to any disclaimer, the term of this patent is extended or adjusted under 35 U.S.C. 154(b) by 697 days.

This patent is subject to a terminal disclaimer.

(21) Appl. No.: 10/349,855

(22) Filed: Jan. 23, 2003

Related U.S. Application Data

(63) Continuation-in-part of application No. 10/324,456, filed on Dec. 20, 2002, which is a continuation-in-part of application No. 10/117,497, filed on Apr. 4, 2002.

(51) Int. Cl.
*G06F 17/00* (2006.01)
*G06F 7/00* (2006.01)

(52) U.S. Cl. ........ 707/8; 707/9; 707/3; 707/100; 707/200

(58) Field of Classification Search ........ 707/8, 707/9, 3, 100, 200
See application file for complete search history.

(56) References Cited

U.S. PATENT DOCUMENTS

| | | | | |
|---|---|---|---|---|
| 5,764,976 A | * | 6/1998 | Hsiao | 707/8 |
| 5,983,215 A | * | 11/1999 | Ross et al. | 707/2 |
| 6,144,983 A | * | 11/2000 | Klots et al. | 718/104 |
| 6,353,828 B1 | * | 3/2002 | Ganesh et al. | 707/8 |
| 6,353,835 B1 | * | 3/2002 | Lieuwen | 707/203 |
| 6,581,205 B1 | * | 6/2003 | Cochrane et al. | 717/140 |
| 6,668,295 B1 | * | 12/2003 | Chan | 710/200 |
| 6,683,291 B2 | * | 1/2004 | Barchers | 250/201.9 |
| 6,687,709 B2 | * | 2/2004 | Williams | 707/103 R |
| 6,708,195 B1 | * | 3/2004 | Borman et al. | 718/102 |

OTHER PUBLICATIONS

Rick Grehan, "*How to Climb a B-tree: B-tree, a popular tree-indexing structure, is perfect for db4o database system, and can save you a lot of disk access time*," printed from http://www.fawcette.com, 25 pages (2002).

Kevin Jones, "*TPFDF B+ Tree Indexing Support*," printed from http://www-3.ibm.com, pp. 1-3 (dated at least as early as Jan. 8, 2003).

(Continued)

*Primary Examiner*—John Cottingham
*Assistant Examiner*—Kuen S. Lu
(74) *Attorney, Agent, or Firm*—Trop, Pruner & Hu; Adam Bennett

(57) ABSTRACT

A database system includes a locking mechanism for a view defined on one or more base relations. A B-tree index is defined on the view. In response to updates of a base relation, predefined locks are placed on the view. With locking mechanisms according to some embodiments of the invention, concurrency of transactions that access the view and B-tree index is enhanced by enabling concurrent updates of the materialized view by plural transactions in certain cases, while avoiding read-write and write-read conflicts.

36 Claims, 25 Drawing Sheets

OTHER PUBLICATIONS

SAP Library-User Manual: SAP DB, "B*Tree," printed from http://pipin.tmd.ns.ac.yu, pp. 1-2 (dated at least as early as Jan. 8, 2003).

J. Gehrke, et al. "*On Computing Correlated Aggregates over Continual Data Streams.*" SIGMOD Conf. pp. 13-24 (2001).

J. Gray, et al., "*Granularity of Locks and Degrees of Consistency in a Shared Data Base.*" IFIP Working Conference on Modeling in Data Base Management Systems, pp. 365-394 (1976).

J. Gray, et al., "Transaction Processing: *Concepts and Techniques.*" Morgan Kaufmann Publishers, pp. 403-406, 409-414, 419, 428, 429, 456-458, 464-481, 848-851, 868-872 (1993).

A. Kawaguchi, et al. "*Concurrency Control Theory for Deferred Materialized Views.*" ICDT, pp. 306-320 (1997).

M. Kornacker, et al., "*Concurrency and Recovery in Generalized Search Trees.*" SIGMOD Conf., pp. 67-72 (1997).

H.F. Korth "*Locking Primitives in a Database System.*" JACM 30(1), pp. 55-79 (1983).

C. Mohan, et al., "ARIES/IM: *An Efficient and High Concurrency Index Management Method Using Write-Ahead Logging.*" SIGMOD Conf., pp. 371-380 (1992).

C. Mohan "*ARIES/KVL: A key-Value Locking Method for Concurrency Control of Multiaction Transactions Operating on B-Tree Indexes.*" VLDB, pp. 392-405, (1990).

C. Mohan "*Commit_LSN: A Novel and Simple Method for Reducing Locking and Latching in Transaction Processing Systems.*" VLDB, pp. 406-418 (1990).

C. Mohan, "*ARIES/LHS: A Concurrency Control and Recovery Method Using Write-Ahead Logging for Linear Hashing with Separators.*" ICDE, pp. 243-252 (1993).

* cited by examiner

Figure 4C initial:

AJV

| A.a | SUM(B.d) |
|-----|----------|
| 1   | 3        | virtual JV

| A.a | B.d |
|-----|-----|
| 1   | 3   | insert (1,1), (1,5)

AJV

| A.a | SUM(B.d) |
|-----|----------|
| 1   | 9        | virtual JV

| A.a | B.d |
|-----|-----|
| 1   | 3   |
| 1   | 1   |
| 1   | 5   |

Figure 5B initial:

AJV — 160

| A.a | SUM(B.d) |
|---|---|
| 1 | 5 |

$T_1$: insert (A.a, B.d)=(1,3)

AJV — 162

| A.a | SUM(B.d) |
|---|---|
| 1 | 8 |

$T_2$: insert (A.a, B.d)=(1,4)

AJV — 164

| A.a | SUM(B.d) |
|---|---|
| 1 | 12 | logical undo $T_1$

AJV — 166

| A.a | SUM(B.d) |
|---|---|
| 1 | 9 |

Figure 13 relation A

| a | c |
|---|---|
| 1 | 4 |

$t_{A1}$ relation B

| d | e |
|---|---|
| 4 | 1 |
| 5 | 2 |
| 6 | 4 |

$t_{B1}$
$t_{B2}$
$t_{B3}$ aggregate join view AJV

| a | sum(e) |
|---|--------|
| 1 | 1 |

$t_{JV1}$ virtual join view JV'

| a | c | d | e |
|---|---|---|---|
| 1 | 4 | 4 | 1 |

$t'_{JV1}$

Figure 14 relation A

| a | c |
|---|---|
| 1 | 4 |
| 1 | 5 |

$t_{A1}$
$t_{A2}$ relation B

| d | e |
|---|---|
| 4 | 1 |
| 5 | 2 |
| 6 | 4 |

$t_{B1}$
$t_{B2}$
$t_{B3}$ aggregate join view AJV

| a | sum(e) |
|---|--------|
| 1 | 3 |

$t_{JV1}$ virtual join view JV'

| a | c | d | e |
|---|---|---|---|
| 1 | 4 | 4 | 1 |
| 1 | 5 | 5 | 2 |

$t'_{JV1}$
$t'_{JV2}$

Figure 15 relation A

| a | c |
|---|---|
| 1 | 4 |
| 1 | 5 |
| 1 | 6 |

$t_{A1}$
$t_{A2}$
$t_{A3}$ relation B

| d | e |
|---|---|
| 4 | 1 |
| 5 | 2 |
| 6 | 4 |

$t_{B1}$
$t_{B2}$
$t_{B3}$ aggregate join view AJV

| a | sum(e) |
|---|--------|
| 1 | 7 |

$t_{JV1}$ virtual join view JV'

| a | c | d | e |
|---|---|---|---|
| 1 | 4 | 4 | 1 |
| 1 | 5 | 5 | 2 |
| 1 | 6 | 6 | 4 |

|   | 2 | 3 | 4 | 5 |
|---|---|---|---|---|
| T |   | Y | Y |   |
|   |   |   |   |   |
|   |   |   |   |   |

Figure 17

|    | 2 | 3 | 4 | 5 |
|----|---|---|---|---|
| T  |   | Y | Y |   |
| T' |   |   | Y | Y |
|    |   |   |   |   |

Figure 18

|   | 2 | 3 |   | 5 |
|---|---|---|---|---|
| T |   | Y | Y |   |
|   |   |   |   |   |
|   |   |   |   |   |

Figure 19

|   | 2 |   |   | 5 |
|---|---|---|---|---|
| T |   | Y | Y |   |
|   |   |   |   |   |
|   |   |   |   |   |

Figure 20

|     | 2 |   |   | 5 |
|-----|---|---|---|---|
| T   |   | Y | Y |   |
|     |   |   |   |   |
| T'' | S |   |   | S |

Figure 26

|   |   |   | 4 |
|---|---|---|---|
| T |   |   | Y |
|   |   |   |   |
|   |   |   |   |

Figure 27

|   |   |   | 4 |
|---|---|---|---|
| T |   |   | Y |
| T' | W |   | W |
|   |   |   |   |

Figure 28

|   | 2 |   | 4 |
|---|---|---|---|
| T |   |   | Y |
| T' | Y |   | Y |
|   |   |   |   |

Figure 29

|   | 2 |   | 4 |
|---|---|---|---|
| T |   |   | Y |
| T' | Y | W | W |
|   |   |   |   |

Figure 30

|    | 2 | 3 | 4 |
|----|---|---|---|
| T  |   |   | Y |
| T' | Y | Y | Y |
|    |   |   |   |

Figure 31

|   | 2 | 3 | 4 |
|---|---|---|---|
| T |   |   | Y |
|   |   |   |   |
|   |   |   |   |

Figure 32

|   |   | 3 | 4 |
|---|---|---|---|
| T |   |   | Y |
|   |   |   |   |
|   |   |   |   |

Figure 33

|     |   | 3 | 4 |
|-----|---|---|---|
| T   |   |   | Y |
|     |   |   |   |
| T'' |   | S |   |

Figure 34

|   | 1 |   |   | 4 |
|---|---|---|---|---|
| T |   | Y |   | Y |
|   |   |   |   |   |
|   |   |   |   |   |

Figure 35

|    | 1 |   |   | 4 |
|----|---|---|---|---|
| T  |   | Y |   | Y |
| T' |   |   | Y | Y |
|    |   |   |   |   |

Figure 36

|    | 1 |   | 3 | 4 |
|----|---|---|---|---|
| T  |   | Y |   | Y |
| T' |   |   | Y | Y |
|    |   |   |   |   |

Figure 37

|   | 1 |   | 3 | 4 |
|---|---|---|---|---|
| T |   | Y |   | Y |
|   |   |   |   |   |
|   |   |   |   |   |

Figure 38

|   | 1 |   | 3 | 4 |
|---|---|---|---|---|
| T |   | Y |   | Y |
|   |   |   |   |   |
| T″ | S |   | S |   |

LOCKING MECHANISM FOR VIEWS ASSOCIATED WITH B-TREE INDEXES

CROSS REFERENCE TO RELATED APPLICATIONS

This is a continuation-in-part of U.S. Ser. No. 10/324,456, filed Dec. 20, 2002, which is a continuation-in-part of U.S. Ser. No. 10/117,497, filed Apr. 4, 2002.

BACKGROUND

A database is a collection of stored data that is logically related and that is accessible by one or more users. A popular type of database is the relational database management system (RDBMS), which includes relational tables made up of rows and columns. Each row represents an occurrence of an entity defined by a table, with an entity being a person, place, or thing about which the table contains information. To extract data from, or to update, a relational table, queries according to a standard database query language (e.g., Structured Query Language or SQL) are used. A table (also referred to as a relation) is made up of multiple rows (also referred to as tuples). Each row (or tuple) includes multiple columns (or attributes).

Various other data structures are also typically associated with relations in a relational database system. For example, a view is a derived relation formed by performing a function on one or more base relations. Rather than storing the view, the function is typically recomputed each time the view is referenced. This type of view is referred to as an "ordinary view."

Unlike an ordinary view, a materialized view is a precomputed, stored query result that can be used for some queries instead of reconstructing the results directly from the base relations. As with the ordinary view, a function is performed on the base relations to derive the materialized view. However, because the materialized view is stored, fast access to the data is possible without recomputing the view.

After the materialized view is created, subsequent queries are able to use the materialized view, where appropriate, to increase query processing speed. Materialized views can be used to assemble data that come from many different relations. One type of view is the join view, which stores join results of multiple base relations.

A materialized view is updated when the underlying base relations are modified. As the base relations are changed through insertion of new tuples, deletion of tuples, or updates to existing tuples, the corresponding rows in the materialized view are changed to avoid becoming stale. This is known as materialized view maintenance.

Relational database systems can be used for data warehouse applications. A data warehouse collects information from several source databases. The collected information is integrated into a single database to be queried by the data warehouse clients. Traditionally, data warehouses have been archival stores used for analysis of historical data. More recently, however, there has been a growing trend to use a data warehouse operationally (referred to as a "operational data warehouse" or "real-time data warehouse"), which involves making relatively real-time decisions about data stored in the data warehouse.

Traditional techniques of maintaining views are usually inadequate (in terms of processing speed) for operational data warehouses due to the real-time update requirements. Furthermore, materialized view maintenance in an operational data warehouse requires transactional consistency. If transactional consistency is enforced by traditional concurrency control mechanisms (including locking mechanisms), the ability of the database system to perform concurrent transactions may be reduced. This hurts performance in a database system, especially in a parallel database system having multiple processing modules.

When a base relation is updated (e.g., new row inserted, existing row deleted, or row modified), the update needs to be propagated to a materialized view as part of the materialized view maintenance. In some systems, to increase operational speeds, reduced levels of consistency are used that allow "dirty reads," which are reads of stale data in relations. However, when such reduced levels of consistency are used in an environment in which materialized views are present, inconsistent query results are often obtained as a result of inaccurate data being captured in materialized views.

Concurrency management is further made more difficult if indexes are maintained for a materialized view. An index is a data structure that contains an arrangement of data values of one or more attributes to enable the database system to find requested rows of a table (or view) more rapidly. There are various different indexes, such as hash indexes, B-tree indexes, and others.

SUMMARY

In general, a method and apparatus are provided to improve concurrency control in a database system in which a B-tree index is maintained for a materialized view. For example, a method of maintaining consistency in a database system comprises storing a view that is based on one or more base relations, and storing a B-tree index for the view. In response to a request to update one of the one or more base relations, a predefined first lock is placed on the view, with the predefined first lock conflicting with either a shared lock or an exclusive lock placed on the view but not conflicting with another predefined first lock placed on the view.

Other or alternative features will become more apparent from the following description, from the drawings, and from the claims.

BRIEF DESCRIPTION OF THE DRAWINGS

FIGS. 4A–4C illustrate example join views based on multiple base relations with projection or aggregation applied.

FIGS. 5A–5B illustrate examples of a logical undo mechanism.

FIGS. 13–15 illustrate the content of base relations and an aggregate join view in an example.

FIGS. 16–20 illustrate locks placed on an aggregate join view by several transactions, according to a first example.

FIGS. 26–33 illustrate locks placed on an aggregate join view by several transactions, according to a second example.

FIGS. 34–38 illustrate locks placed on a join view by several transactions, according to another example.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

I. Introduction

In accordance with some embodiments of the invention, a locking mechanism for materialized views (such as join views) is provided in a relational database system. A common form of materialized view is the join view, which is a view that stores and maintains the result of a join of multiple base relations (also referred to as "base tables"). However, locking mechanisms described here can be extended to other types of views.

The following provides an example query for creating a join view (JV) on two base relations (A, B):

CREATE JOIN VIEW JV AS
SELECT*
FROM A, B
WHERE A.c=B.d
PARTITIONED ON A.e;

The join view JV includes tuples (also referred to as "rows") of base relations A and B where the attributes (also referred to as "columns") A.c and B.d are equal. The join view JV is partitioned on the attribute A.e. In other examples, a join view can be stored for a join of more than two base relations. In the following description, the terms "table" and "relation" are used interchangeably. Also, a table or relation has rows (or tuples) and columns (or attributes). The terms "row" and "tuple" are used interchangeably, and the terms "column" and "attribute" are used interchangeably.

Figure 1:
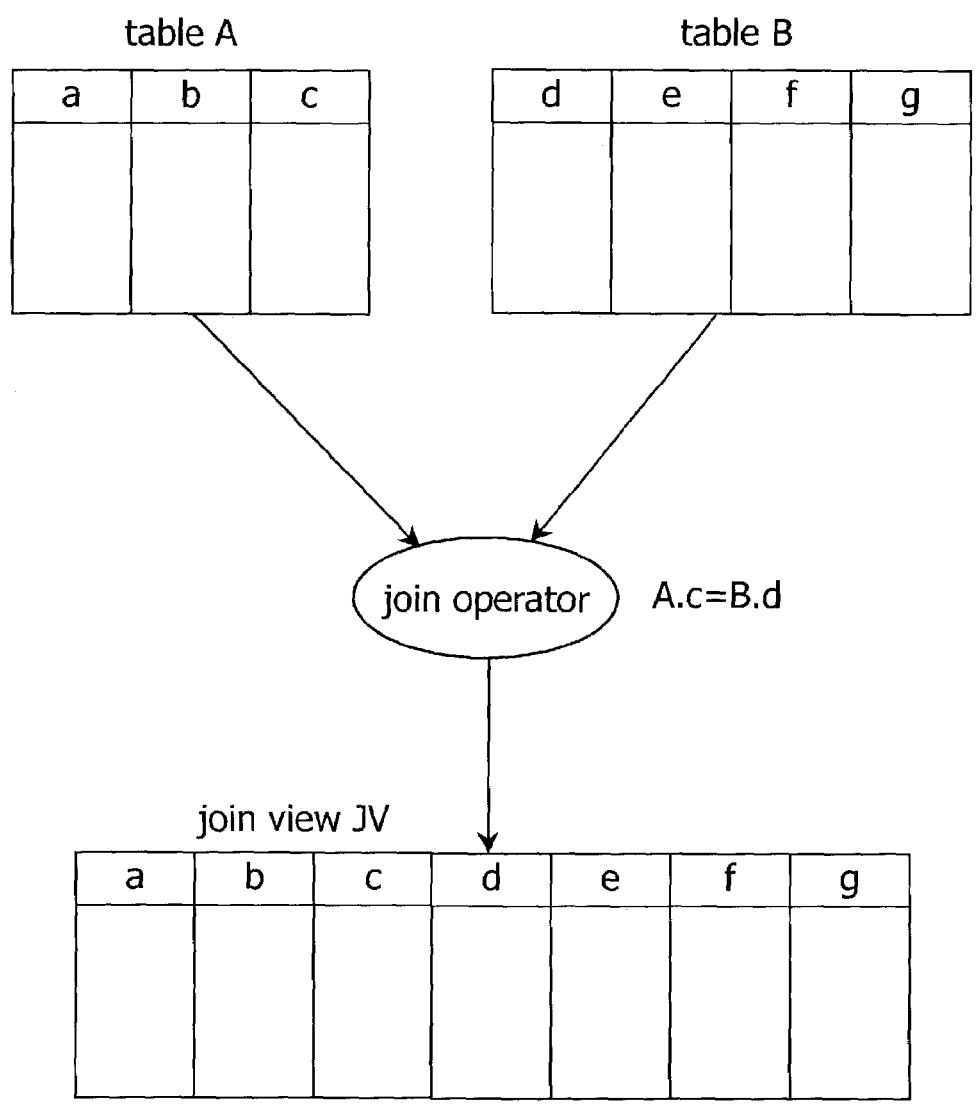
FIG. 1 illustrates an example join view based on multiple base relations.

The join relations A and B and the join view JV created as a result of the query is shown in FIG. 1. Relation A has attributes a, b, c, and relation B has attributes d, e, f, g. The "SELECT*" clause selects all attributes of relations A and B for insertion into the join view JV (which contains attributes a, b, c, d, e, f, g). Note that less than all attributes of relations A and B can be projected into the join view JV, in which case less than all of the attributes a, b, c, d, e, f, g, are stored in the join view JV.

Another type of join view is an aggregate join view, which stores join results of a join of multiple base relations, with the join results grouped by one or more grouping attributes and the grouped rows aggregated on one or more attributes. As one example, an aggregate join view can be created as follows:

CREATE AGGREGATE JOIN VIEW AJV AS
SELECT A.a, SUM (A.b)
FROM A, B
WHERE A.c=B.d
GROUP BY A.a;

The grouping attribute specified in the example query is A.a. This causes rows of the join result to be grouped according to different values of A.a. The aggregate operator specified in the example query is SUM, which causes the values of A.b of rows that are combined into each group to be summed.

There are various different types of locks that can be placed on data stored in relational tables to restrict access to or the ability to modify the data. Table-level locks are placed on an entire table or relation. Table-level locks include a table-level shared (S) lock and a table-level exclusive (X) lock. Generally, once placed on a table, a table-level S lock blocks a subsequent transaction that attempts to write to any part of the table. A table-level X lock placed on a table is more restrictive, as it blocks any subsequent transaction that attempts to read from or write to any part of the table.

While a table-level locking mechanism locks an entire table, a value locking mechanism locks only a portion of the table. The value locking mechanism specifies a value (or values) of an attribute(s) in a table for which locks are to be placed. Such an attribute, or attributes, is referred to as a value locking attribute, or value locking attributes. A value locking mechanism usually locks only one row or a few rows.

Value locks include a shared (S) value lock and an exclusive (X) value lock. To place an X value lock on an attribute value of a base relation R, a table-level intention exclusive (IX) lock is first placed on R. Similarly, to place an S value lock on an attribute value of the base relation R, a table-level intention shared (IS) lock is first placed on R.

A table-level IX lock is placed on a relation to prevent any subsequent table-level X or S locks on the same relation. The IX lock is a mechanism for the database system to efficiently determine whether a subsequent table-level X or S lock can be placed, without having to find out if there is a conflicting value lock on the relation. For example, suppose the value locking attribute of a relation R is attribute R.a. There can potentially be multiple value locks placed on multiple values of R.a. Thus, a first X value lock can be placed on row(s) of the relation R with R.a=5, a second X value lock can be placed on row(s) of relation R with R.a=2, and so forth. If a subsequent transaction attempts to read the entire relation R, the subsequent transaction will need to acquire a table-level S lock. One way to determine if the table-level lock S lock can be granted is by finding each R.a value for which there is an X value lock. However, this is inefficient. Instead, according to some embodiments, a table-level IX lock is placed on the relation R if there is at least one X value lock on the base relation R. Thus, to determine if the table-level S lock can be placed on the relation R, the database system can quickly detect that there is already an IX lock placed on the relation R, which blocks acquisition of the table-level S lock. Note that only one IX lock is needed for multiple X value locks of a relation. The IX lock also blocks any subsequent table-level X lock.

Similarly, a table-level IS lock placed on a relation R for an S value lock blocks any subsequent table-level X lock.

If a transaction T attempts to update base relation R, the transaction has two choices: (1) T can place a table-level X lock on base relation R; or (2) T can place an IX lock on R and an X value lock on some value locking attribute of R. Similarly, if transaction T attempts to read base relation R, transaction T also has two choices: (1) T can place a table-level S lock on R; or (2) T can place an IS lock on R and an S value lock on some value locking attribute of R.

If materialized views are also stored in the database system, a locking mechanism is also provided for the materialized view. In one embodiment, a "Y-lock" locking mechanism is provided for the materialized view. As a further enhancement to the Y-lock locking mechanism, a "W value lock" (also referred to as W-lock) locking mechanism is also provided to enable proper updates of an aggregate join view by multiple transactions.

II. Example Database System Arrangement

Figure 2:
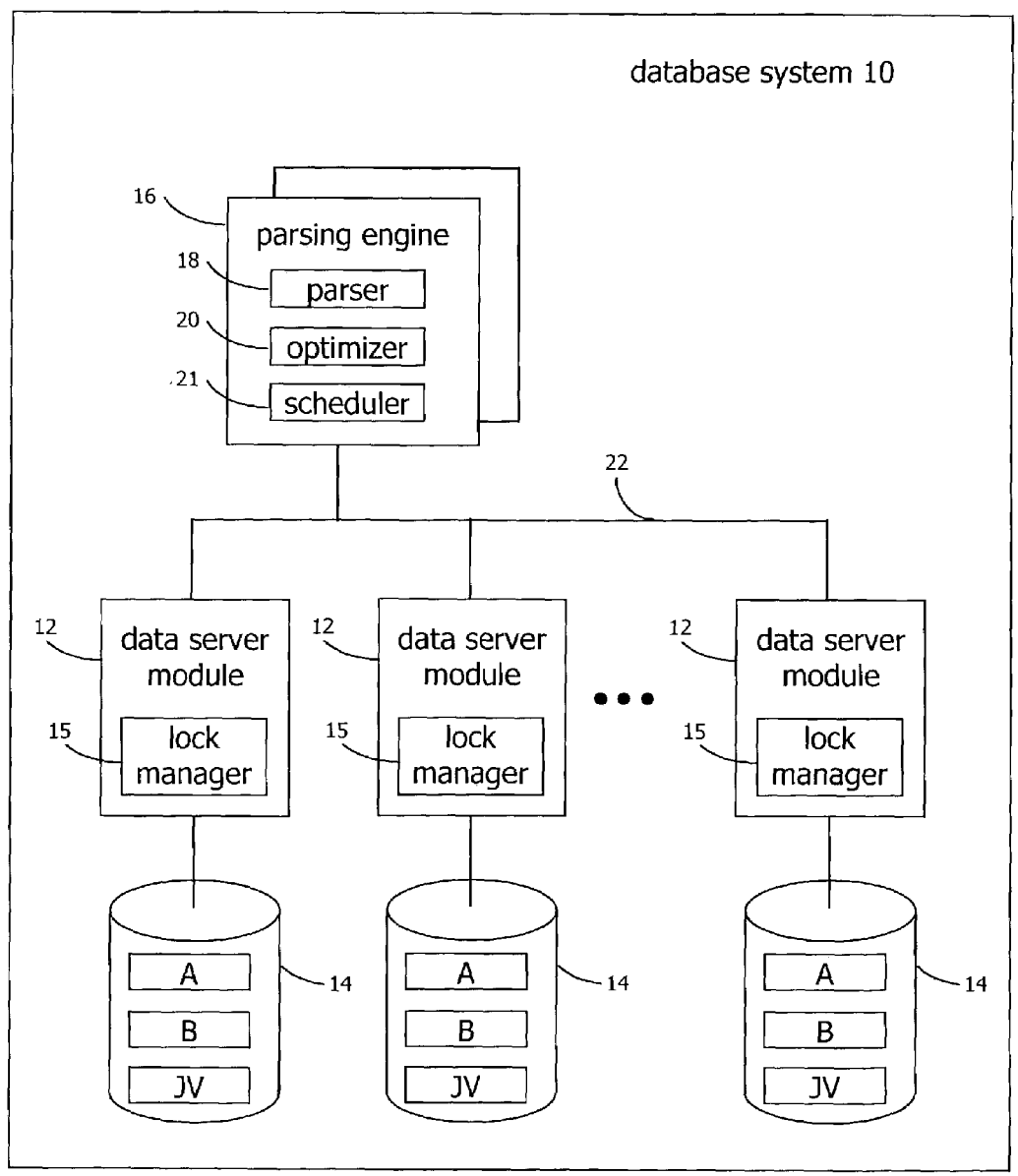
FIG. 2 is a block diagram of an example arrangement of a database system.

FIG. 2 shows an example arrangement of a database system 10 that stores base relations (e.g., A, B) and join views (e.g., JV). The database system 10 is a parallel database system having a plurality of data server modules 12. Each data server module 12 is responsible for managing the access to or modification of data stored in a respective storage module 14. Examples of the responsibilities of each data server module (also referred to as "an access module") include locking databases, tables, or portions of tables; creating, modifying, or deleting definitions of tables; inserting, deleting, or modifying rows within tables; and retrieving information from definitions and tables. The data server modules, after executing an action, also return responses to a requesting client. In one example implementation, the data server modules 12 are based on access module processors (AMPs) in TERADATA® database systems from NCR Corporation.

According to one embodiment, each data server module 12 includes a lock manager 15 to provide a locking mechanism according to some embodiments of the invention. Thus, the lock manager 15 is responsible for placing locks (e.g. table-level locks or value locks) on base relations and join views. As shown, the locking mechanism is distributed across plural data server modules 12. Alternatively, a centralized lock manager is employed.

In one embodiment, the requesting client that sends commands to the data server modules 12 include one or more parsing engines 16. The parsing engine(s) 16 receive requests from users or applications, which are in the form of queries according to a standard database query language (such as a Structured Query Language or SQL, as provided by the American National Standards Institute or ANSI). In other embodiments, other types of database query languages can be used.

Each parsing engine 16 includes a parser 18 and an optimizer 20. The parser 18 checks a received request for proper syntax and semantically evaluates the request. The optimizer 20 develops an execution plan for the received request. In some embodiments, the optimizer 20 uses a cost-based mechanism to select a least expensive (in terms of system resources utilized) execution plan for the query.

The execution plan includes a series of "steps" that are communicated to one or more of the data server modules 12 over a communications network 22. If the execution plan can be executed by one data server module 12, then the parsing engine 16 sends the one or more steps of the execution plan to the one data server module 12. However, if plural data server modules 12 are involved in the execution plan, the parsing engine 16 sends the step(s) to the plural data server modules 12. The sequence in which steps of an execution plan are executed is controlled by a scheduler 21 in the parsing engine 16.

In the example shown in FIG. 2, base relations A and B are stored in plural storage modules 14 associated with corresponding data server modules 12. Each base relation A or B is partitioned into plural partitions based on one or more selected attributes (referred to as the primary index) of the base relation. Each partition stored on a respective storage module 14 includes a subset of all the rows of the base relation. A join view (JV), such as a join view based on a join of tables A and B, is also partitioned across the plurality of storage modules 14. In the example join view CREATE statement above, the join view is partitioned on attribute A.e of base relation A. Thus, a first partition of the join view JV is stored on a first storage module 14 based on some value(s) of A.e; a second partition of JV is stored on a second storage module 14 base on some other value(s) of A.e; and so forth.

Although the storage modules 14 are shown as separate modules, they can be part of the same storage subsystem. Alternatively, the storage modules 14 can be separate storage devices. In another embodiment, instead of plural data server modules 12, the database system 10 can include only one data server module 12. The locking mechanism according to the various embodiments can be applied to a single-data server module database system rather than the multiple-data server module database system shown in FIG. 2.

III. Y-Lock Locking Mechanism

In accordance with one embodiment of the invention, the locking mechanism provided for the join view is a "Y-lock" locking mechanism. A join view can refer to either an aggregate join view or a non-aggregate join view. A Y lock has similar functionality as an X lock, with the major difference being that the Y lock does not conflict with itself. In other words, the Y lock is a modified type of exclusive lock placed on a join view that allows subsequent Y locks to be placed on the same join view even though a first Y lock is still active on the join view. In contrast, a table-level X lock placed on a join view blocks a subsequent X lock on the same join view. By enabling multiple Y locks to be concurrently placed on the same join view, throughput of transactions in the database system 10 can be greatly increased, as the possibility of lock conflicts on the join views among different transactions is reduced. A Y lock is also referred to as a "modified-exclusive" lock.

Figure 3:
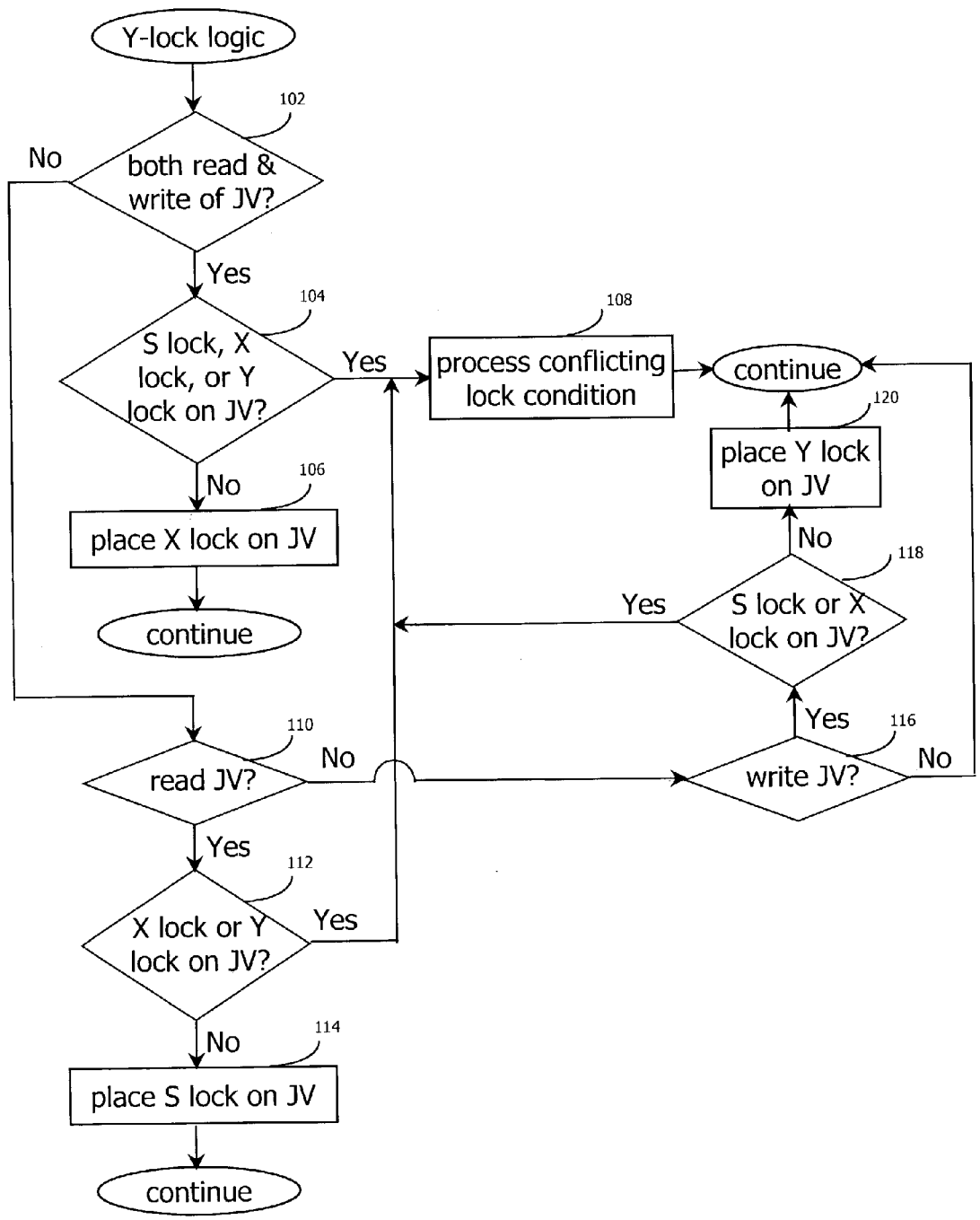
FIG. 3 is a flow diagram of logic for a Y-lock locking mechanism according to one embodiment for join view maintenance.

Three types of table-level locks are allowed on a join view (JV): Y locks, S locks, and X locks. The conditions under which such table-level locks are allowed are shown by the logic of FIG. 3. The logic shown in FIG. 3 is performed by a data server module 12 in the database system 10 of FIG. 2. If more than one data server module 12 is involved in a particular transaction, then each data server module 12 performs the acts of FIG. 3 concurrently.

Upon receiving steps associated with a transaction, the data server module 12 first determines (at 102) if the transaction specifies both a read and write of the join view JV. As used here, writing a view is also referred to as updating or modifying the view. If the transaction specifies both a read and write of JV, then the data server module 12 determines (at 104) if an S lock, X lock, or Y lock is currently active on the join view JV. If none of an S lock, X lock, or Y lock is active on the join view JV, the data server module 12 places (at 106) an X lock on the join view JV. Note that the X lock required for the received transaction conflicts with any of an X lock, S lock, or Y lock, so that the presence of any such table-level lock on JV blocks the required X lock for the received transaction.

If the data server module 12 determines (at 104) that any of the S lock, X lock, or Y lock is active on JV, the data server module 12 performs (at 108) conflicting lock processing. For example, the data server module 12 can wait until the current conflicting lock has been released. Different embodiments perform different tasks in response to detecting that a received transaction cannot proceed because of conflicting locks placed on the join view JV.

If the transaction is determined not to involve both a read and write of the join view JV (at 102), the data server module 12 checks (at 110) if the transaction involves a read (but not a write) of the join view. If so, the data server module 12 checks (at 112) if there is either a Y lock or an X lock on JV. If neither a Y lock nor X lock is currently active on JV, the data server module 12 places (at 114) an S lock on the join view JV. Note that the required S lock conflicts with either a Y lock or X lock, so that the presence of either the Y lock or X lock blocks acquisition of the S lock for the received transaction. If either a Y lock or X lock is presently active on JV, the data server module 12 processes (at 108) the conflicting lock condition.

If the transaction does not involve a read of the join view JV, the data server module checks (at 116) if the transaction involves a write (but not a read) of the join view JV. If so, the data server module 12 checks (at 118) if there is either an S lock or an X lock on JV. If not, then the data server module 12 places (at 120) a Y lock on the join view JV. However, if either an S lock or an X lock is presently active on JV, the data server module 12 processes (at 108) the conflicting lock condition.

The discussion above refers to placing a table-level Y lock on a join view. The Y-lock locking mechanism for join views is extendable to also allow value locks on join views. Consider a join view JV defined on base relations $R_1$, $R_2, \ldots,$ and $R_n$. For a fixed i ($1 \leq i \leq n$), suppose that $R_i.a_i$ is an attribute of base relation $R_i$ that also appears in JV. This is the case for the example join view JV of FIG. 1. Then X, Y, and S value locking on $R_i.a_i$ for JV is allowed. For example, consider a transaction T that only updates base relation $R_i$. If the update to base relation $R_i$ specifies the value(s) of $R_i.a_i$, then transaction T can also place an IY lock on JV and one or several Y value locks on $R_i.a_i$ for JV. If transaction T reads JV by specifying the $R_i.a_i$ value(s), then transaction T can put an IS lock on JV and one or several S value locks on $R_i.a_i$ for JV. If transaction T both reads and updates JV by specifying the $R_i.a_i$ value(s), then transaction T can put an IX lock on JV and one or several S value locks, Y value locks, and X value locks on $R_i.a_i$ for JV.

The IY lock is similar to the traditional IX lock except that it is compatible with a Y lock or another IY lock. As with the IX lock, the table-level IY lock is placed on the join view JV in conjunction with an Y value lock of JV to indicate to subsequent transactions that table-level X or S locks on JV are blocked (however, a table-level Y or IY lock on JV is still possible in the presence of the IY lock with Y value lock). Also, a subsequent IS lock with an S value lock on JV is allowed in the presence of an IY lock with Y value lock on JV.

For a transaction that performs both a (table-level) read and (value) write of the join view JV, both an S lock and X value lock are needed on the join view JV. In this case, a table-level SIY lock (which is equivalent to an S lock and an IY lock) is placed on JV. The SIY lock is similar to the traditional SIX lock. One can think that IX=IS+IY. An SIX lock is equivalent to an S lock and an IX lock (for an X value lock). The SIY lock is only compatible with the IS lock.

Note that SIX=S+IX=S+(IS+IY)=(S+IS)+IY=S+IY=SIY. Thus, the SIX lock is the same as the SIY lock.

If transaction T both updates JV (without specifying the $R_i.a_i$ value(s)), which is a table-write, and reads JV (specifying the $R_i.a_i$ value(s)), which is a value-read, then transaction T requires both a Y lock and S value lock(s) on JV. In this case, a table-level YIS lock is played on JV (which is equivalent to a Y lock and an IS lock). The YIS lock (Y+IS) is similar to the SIX lock and is only compatible with the IY lock.

The compatibilities of the different locks are listed in Table 1.

TABLE 1

|     | Y   | S   | X   | IS  | IY  | IX  | SIY | YIS |
| --- | --- | --- | --- | --- | --- | --- | --- | --- |
| Y   | yes | no  | no  | no  | yes | no  | no  | no  |
| S   | no  | yes | no  | yes | no  | no  | no  | no  |
| X   | no  | no  | no  | no  | no  | no  | no  | no  |
| IS  | no  | yes | no  | yes | yes | yes | yes | no  |
| IY  | yes | no  | no  | yes | yes | yes | no  | yes |
| IX  | no  | no  | no  | yes | yes | yes | no  | no  |
| SIY | no  | no  | no  | yes | no  | no  | no  | no  |
| YIS | no  | no  | no  | no  | yes | no  | no  | no  |

According to Table 1, a Y lock on JV is compatible with another Y lock or an IY lock on JV. However, the Y lock is incompatible with a table-level S lock, X lock, IS lock, IX lock, SIY lock, or YIS lock. Note that a table-level X lock is incompatible with any lock. An IY lock on JV is compatible with a table-level Y lock, IS lock, IY lock, IX lock, or YIS lock. However, an IY lock is incompatible with a table-level S lock, X lock, and SIY lock. An IX lock is compatible with an IS, IY, or IX lock, but not with any other locks. An SIY lock (S+IY lock) is compatible with an IS lock, but not with any other locks. A YIS lock (Y+IS lock) is compatible with an IY lock, but not with any other locks.

Figure 6:
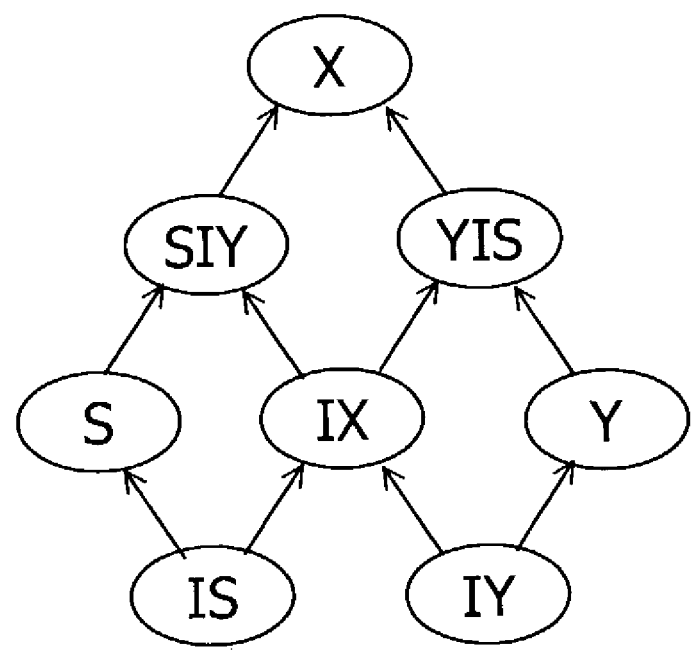
FIG. 6 illustrates a lock conversion lattice.

A lock conversion lattice is shown in FIG. 6. The top of the lattice is a node corresponding to the strongest lock available in the database system—the X lock. The bottom of the lock conversion lattice has nodes corresponding to the two weakest locks—the IS lock and the IY lock. If a lock is held in one mode (corresponding to one of the nodes of the lock conversion lattice) and requested in a second mode, then the locking mode is converted to the maximum of the two modes in the lock conversion lattice. The possible transitions between the locking modes are indicated by the arrows in FIG. 6.

The Y-lock locking mechanism also applies to any single-table materialized view MV defined on base relation R as $MV=\pi(\sigma(R))$ and any single-table aggregate materialized view AMV defined on base relation R as $AMV=\gamma(\pi(\sigma(R)))$. $\sigma$ denotes a selection operator, $\pi$ denotes a projection operator, and $\gamma$ denotes an aggregate operator.

Using the Y-lock locking mechanism, multiple transactions are able to update the same tuple in an aggregate join view AJV simultaneously. This may lead to an undesirable phenomenon. For example, consider the following two transactions T and T'. Each transaction inserts a new tuple into a base relation of AJV and generates a join result tuple. If both join result tuples have the same group by attribute(s) value (group by attribute(s) refer to the attribute(s) in the GROUP BY clause of the aggregate join view definition), then both join result tuples should be aggregated into the same tuple in the aggregate join view AJV. However, if Y locking is employed, it may be possible to insert two new tuples into the aggregate join view AJV as two separate tuples, even though the two new tuples should be combined as one tuple and aggregated in the aggregate join view.

Alternatively, if the aggregate join view AJV originally contains no tuple with a given group by attribute(s) value, then two new two join result tuples that are being inserted may be inserted as two different new tuples in the aggregate join view AJV. For example, this may happen when the aggregate join view AJV is stored in a hash file in which a Y value lock (or a table-level Y lock) instead of an X value lock (or a table-level X lock) is used.

The following describes an example employing the Y value lock to illustrate this phenomenon. Suppose the schema of the aggregate join view AJV is (a, SUM(b)), where attribute a is the value locking attribute. The aggregate join view AJV is stored in a hash file where attribute a is the hash key. Suppose originally the aggregate join view AJV contains tuple (20, 2) and several other tuples. However, there is no tuple whose attribute a=1 in the aggregate join view AJV. Consider the following three transactions T, T', and T". Transaction T inserts a new tuple into a base relation R of AJV and generates the join result tuple (1, 1) that needs to be integrated into AJV. Transaction T' inserts another new tuple into the same base relation R of AJV and generates the join result tuple (1, 2) that needs to be integrated into AJV. Transaction T" deletes a third tuple from base relation R of AJV so that tuple (20, 2) needs to be deleted from AJV.

Figure 7:
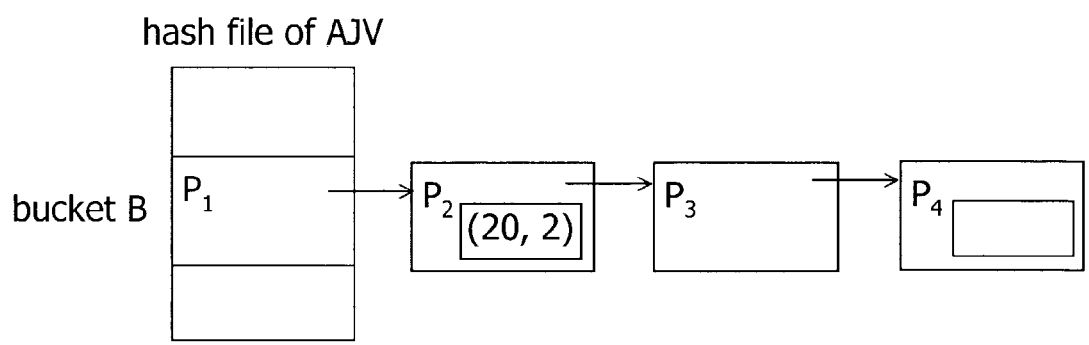
FIGS. 7–10 illustrate pages of a hash file.

After executing these three transactions, tuple (20, 2) should be deleted from AJV while tuple (1, 3) should be inserted into AJV. Suppose 20 and 1 have the same hash value so that tuple (20, 2) and tuple (1, 3) are stored in the same bucket B of the hash file. Suppose there are four pages in bucket B: one bucket page $P_1$ and three overflow pages $P_2$, $P_3$, and $P_4$. All these pages are linked together as illustrated in FIG. 7. Pages $P_1$, $P_2$, and $P_3$ are full and there is no open slot there. There are several open slots in page $P_4$.

Using Y value locks, transactions T, T', and T" may be executed in the following manner. Transaction T gets a Y value lock for attribute a=1 on AJV. Transaction T applies the hash function to attribute a=1 to find the corresponding hash table bucket B. Transaction T crabs all the pages in bucket B to see whether a tuple $t_2$ whose attribute a=1 already exists in the hash file or not. After crabbing, transaction T finds that no such tuple $t_2$ exists. "Crabbing" refers to a procedure in which a transaction does not release a semaphore on one page until the transaction obtains a semaphore on the next page.

Transaction T' gets a Y value lock for attribute a=1 on AJV. Transaction T' applies the hash function to attribute a=1 to find the corresponding hash table bucket B. Transaction T' crabs all the pages in bucket B to see whether a tuple $t_2$ whose attribute a=1 already exists in the hash file or not. After crabbing, transaction T' finds that no such tuple $t_2$ exists.

Figure 8:
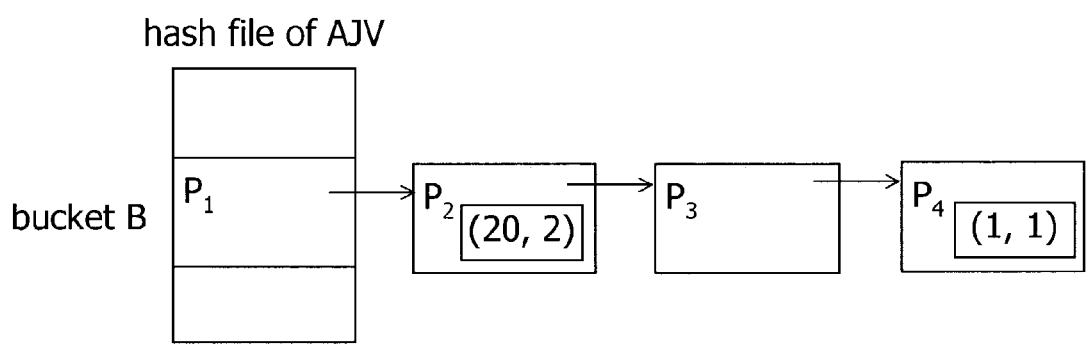

Transaction T crabs the pages in bucket B again. Transaction T finds that only page $P_4$ has enough free space. Transaction T inserts a new tuple (1, 1) into page $P_4$ (as shown in FIG. 8) for the join result tuple (1, 1). Transaction T commits and releases the Y value lock for attribute a=1 on AJV.

Figure 9:
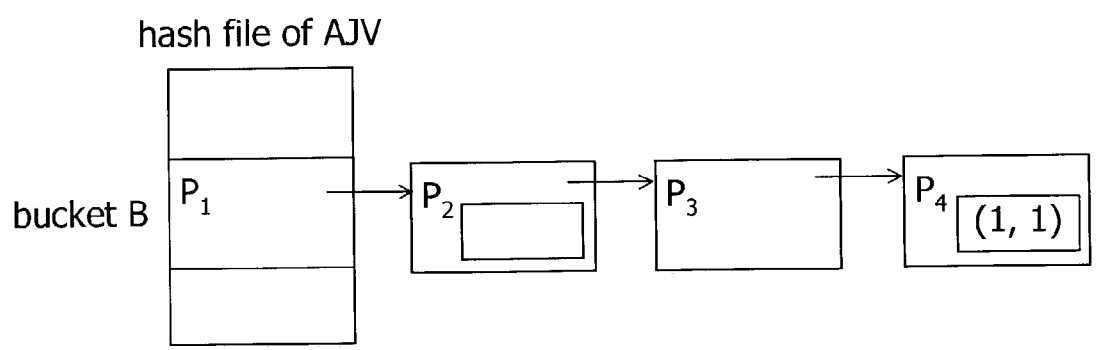

Transaction T" gets a Y value lock for attribute a=20 on AJV. Transaction T" finds that tuple (20, 2) is contained in page $P_2$. Transaction T" deletes tuple (20, 2) from page $P_2$ so that there is an open slot in page $P_2$ (see FIG. 9). Transaction T" commits and releases the Y value lock for attribute a=20 on AJV.

Figure 10:
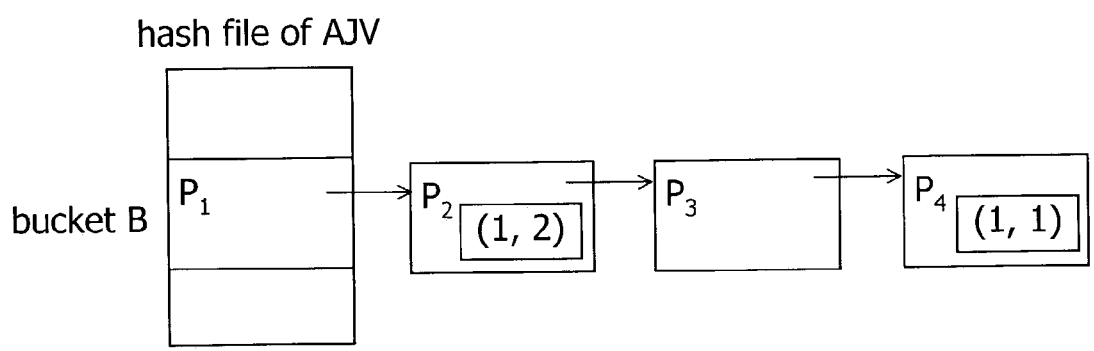

Transaction T' crabs the pages in bucket B again. Transaction T' finds that page $P_2$ has an open slot. Transaction T' inserts a new tuple (1, 2) into page $P_2$ (as shown in FIG. 10) for the join result tuple (1, 2). Transaction T' commits and releases the Y value lock for attribute a=1 on AJV.

As shown in FIG. 10, the aggregate join view AJV contains two tuples (1, 1) and (1, 2) instead of a single tuple (1, 3), which is not correct. To prevent this undesirable situation from occurring, a short-term W value lock mode is employed for aggregate join views. The W value lock mode guarantees that for each aggregate group, at any time at most one tuple corresponding to this group exists in the aggregate join view AJV. The W value lock mode is only compatible with the Y value lock mode. The compatibilities of the different value locks are listed in Table 2.

TABLE 2

|   | Y   | S   | X  | W   |
|---|-----|-----|----|-----|
| Y | yes | no  | no | yes |
| S | no  | yes | no | no  |
| X | no  | no  | no | no  |
| W | yes | no  | no | no  |

As indicated by Table 2, the Y value lock is compatible with another Y value lock, which enables multiple tuples with the same Y value lock to be updated in an aggregate join view AJV. A W value lock is compatible with a Y value lock; however, a W value lock is not compatible with itself. In other words, if a W value lock is placed on a given value locking attribute value for a first update, then a second update seeking another W value lock on the same value locking attribute value will be blocked.

Figure 11:
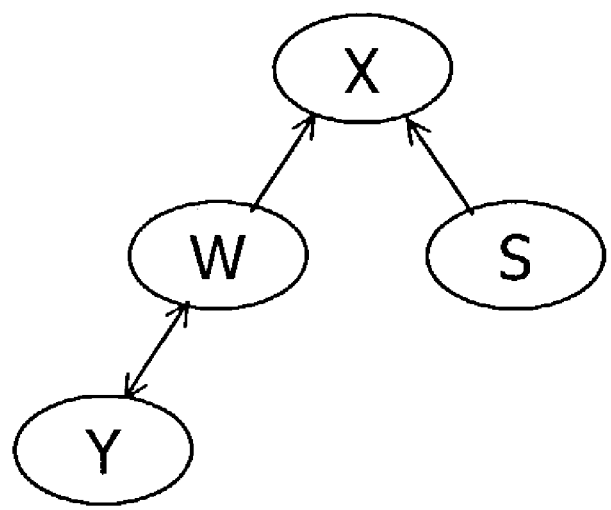
FIG. 11 illustrates another lock conversion lattice that illustrates transitions between different locks, including a W value lock according to some embodiments.

The value lock conversion lattice is shown in FIG. 11. The database system is able to convert the W value lock into either an X value lock or a Y value lock. In other words, it is capable of converting the W value lock into either a stronger lock (X lock) or a weaker lock (Y lock).

Figure 12:
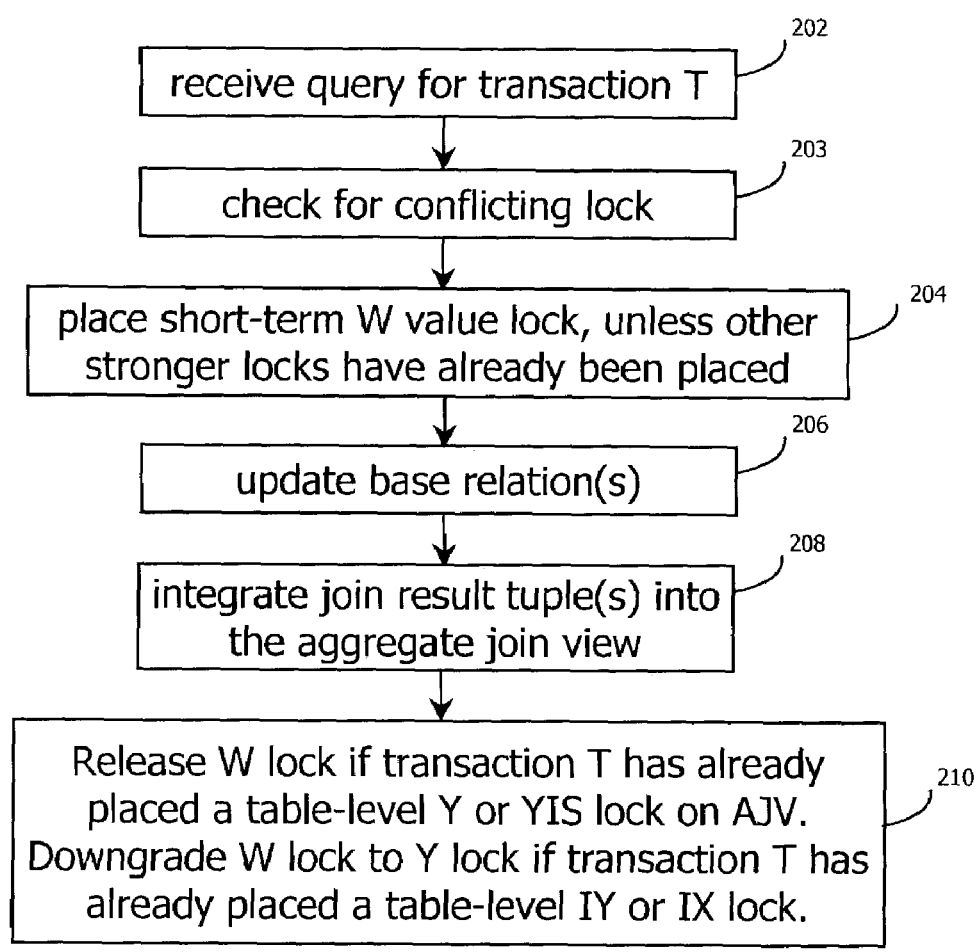
FIG. 12 is a flow diagram of a process that utilizes a W value lock when updating an aggregate view.

In the following discussion, it is assumed that the aggregate join view AJV has a value locking attribute $a_i$. As shown in FIG. 12, a flow of tasks performed by the database system 10 in accordance with an embodiment is illustrated. The tasks are performed by the database software (e.g., one or more of the parsing engine 16 and data server modules 12 shown in FIG. 2). In response to receiving (at 202) a database query, the database system 10 performs tasks of the requested transaction T. For purposes of this example, it is assumed that the transaction T updates one or more base relations, and an aggregate join view is defined on the one or more base relations. Updates of the one or more base relations cause corresponding updates of the aggregate join view to occur. For example, if transaction T inserts a new tuple into a base relation, then a new join result tuple, referred to as join result tuple $t_1$, is also generated for integration into the aggregate join view AJV. "Integrating" a tuple into an aggregate join view AJV refers to inserting a join result tuple into the AJV or combining the join result tuple with another existing tuple in the aggregate join view AJV that belongs to the same group as the join result tuple.

Transaction T next checks (at 203) for conflicting locks (locks that conflict with a W value lock) that have been placed on the aggregate join view AJV. A lock that conflicts with a W value lock placed on the value $t_1.a_i$ includes an exclusive lock (table-level X lock or an X value lock on the same value $t_1.a_i$), a shared lock (table-level S lock or an S value lock on the same value $t_1.a_i$), or another W value lock placed on the same value $t_1.a_i$.

If no conflicting lock has been placed on AJV, transaction T places (at 204) a short-term W value lock (assuming another stronger lock has not already been placed) for $t_1.a_i$ on AJV before it can integrate the join result tuple $t_1$ into the aggregate join view AJV. If transaction T has already placed an X value lock for $t_1.a_i$, a table-level X lock, or a table-level SIY lock on AJV, this W value lock is not necessary. If transaction T has already put a Y value lock for $t_1.a_i$ on AJV, this Y value lock is upgraded to the W value lock (unless transaction T has already put a table-level SIY lock on AJV).

Transaction T then performs the update (at 206) of the base relation(s), and integrates (at 208) the join result tuple (or multiple join result tuples) into the aggregate join view AJV. After transaction T integrates the join result tuple $t_1$ into AJV, the database system 10 performs (at 210) one of two tasks: (1) the short-term W value lock is released if transaction T has already placed a table-level Y (or YIS) lock on AJV, or (2) the short-term W value lock is downgraded to a long-term Y value lock (that will be held until the end of the transaction) if transaction T has already placed a table-level IY (or IX) lock on AJV.

Using the W value lock mode, the undesirable situation described above (multiple join result tuples belonging to the same group are integrated as different tuples in the aggregate join view AJV) will not occur. Such an undesirable situation may occur under the following conditions: (1) two transactions want to integrate two new join result tuples into the aggregate join view AJV simultaneously, (2) these two join result tuples belong to the same aggregate group, and (3) no tuple corresponding to that aggregate group currently exists in the aggregate join view AJV. Using the short-term W value lock, one transaction, such as T, performs the update to the aggregate join view AJV first (by inserting a new tuple $t_2$ with the corresponding group by attribute value into AJV). During the period that transaction T holds the short-term W value lock, no other transaction can integrate another join result tuple that has the same group by attribute value as tuple $t_2$ into the aggregate join view AJV. Then when another transaction T' does the update to the aggregate join view AJV, the second transaction T' will see the existing tuple $t_2$ in AJV. Thus, transaction T' will aggregate its join result tuple that has the same group by attribute value as tuple $t_2$ into tuple $t_2$ (rather than insert a new tuple into AJV).

Note the W value lock mode is also applicable to enhance the Y-lock locking mechanism to be used for single-table aggregate materialized views AMV.

The following provides an example of a situation where both a Y value lock and a W value lock can be placed concurrently on an aggregate join view. Suppose the aggregate join view AJV has the schema (a, SUM(b)), where a is the value locking attribute. Suppose the definition of AJV is CREATE AGGREGATE JOIN VIEW AJV
AS SELECT A.a, SUM(B.b)
FROM A, B
WHERE A.c=B.d
GROUP BY A.a;

Also assume that base table A is of the schema (a, c), and base table B is of the schema (b, d). Suppose there are two tuples in base table B whose values are (2, 3) and (7, 4), and there is one tuple in base table A whose value is (1, 3). Also assume tuple-level locking is used on base table A. In this example, the AJV contains only one tuple (1, 2). A transaction T1 is received that wants to delete the tuple (1, 3) from table A. Transaction T1 will place a Y value lock on AJV for a=1 in order to delete (1, 2) from AJV. Another transaction T2 is also received that wants to insert another tuple (1, 4) into table A. Transaction T2 will place a W value lock on AJV for a=1 to insert the join result tuple (1, 7) into AJV. Transactions T1 and T2 do not conflict, since the Y value lock and the W value lock do not conflict with each other.

IV. Isolation Property of Y Locks

To show that the Y-lock locking mechanism keeps the isolation property (serializability) of transactions, the following assertions are proven for a join view JV defined on base relations $R_1, R_2, \ldots,$ and $R_n$:

Assertion 1: Transaction T's writes to join view JV are neither read (first part of Assertion 1) nor written (second part of Assertion 1) by other transactions until transaction T completes (aborts or commits).

Assertion 2: Transaction T does not overwrite dirty data of other transactions (data that is being modified by other transactions) in join view JV.

Assertion 3: Transaction T does not read dirty data of other transactions in join view JV.

Assertion 4: Other transactions do not write any data in join view JV that is read by transaction T before transaction T completes.

The four assertions are first proven for the simple case where $JV=\sigma(R_1 \bowtie \ldots \bowtie R_i \bowtie \ldots \bowtie R_n)$, where $\sigma$ denotes a selection operator. The assertions are also proven (further below) for the general case where $JV=\pi(\sigma(R_1 \bowtie \ldots \bowtie R_i \bowtie \ldots \bowtie R_n))$, where $\pi$ is a projection operator. Selection refers to selecting rows of base relations to place into JV based on the rows satisfying the join condition. Projection refers to projecting only those attributes that are in the select list of the join query into the join view JV. Less than all attributes of each base relation can be projected into the join view JV.

It is assumed that join view JV allows duplicate tuples. If no duplicate tuples are allowed in JV, assume that each tuple in JV has a dupent (or some other named parameter) attribute recording the number of copies of that tuple. The following assumptions are made (the other more complex cases can be proven in a similar way): (1) any transaction T updates at most one base relation of JV; and (2) if transaction T tries to update base relation $R_i$ ($1 \leq i \leq n$), it places a Y lock on JV and an S lock on each $R_j$ ($1 \leq j \leq n, j \neq i$). For example, if a join view JV is defined on base relations A, B, and C, an update of A causes an X lock or IX lock to be placed on A, and a Y lock to be placed on JV. In addition, an S lock is placed on each of the other base relations B and C.

If transaction T writes join view JV, T places a table-level Y lock on JV until T completes. If transaction T both reads and writes join view JV, T places a table-level X lock on JV until T completes. Thus transaction T's writes to join view JV are not read by any other transaction T' until transaction T completes, since T' requires a table-level S lock on JV (which would conflict with the Y lock or X lock on JV for transaction T). This proves the first part of Assertion 1

Additionally, if transaction T writes join view JV, there are two possible cases:

Case 1: Transaction T both reads and updates join view JV. In this case, transaction T puts a table-level X lock on JV until it completes. This X lock will block other transactions from writing JV (by blocking other Y or X lock requests).

Case 2: Transaction T updates the base relation $R_i$ ($1 \leq i \leq n$). Transaction T puts an S lock on each $R_j$ ($1 \leq j \leq n, j \neq i$) until T completes. If another transaction T' tries to write join view JV before transaction T completes, transaction T' can only update the same base relation $R_i$. This is because if transaction T' updates another base relation $R_j$ ($1 \leq j \leq n, j \neq i$) of join view JV, the requirement of an IX or X lock on $R_j$ for transaction T' will be blocked by the existing S lock on $R_j$ that is placed by transaction T.

Suppose that transactions T and T' update $\Delta R_i$ and $\Delta R_i'$ of base relation $R_i$, respectively. $\Delta R_i$ refers to the changed portion of $R_i$ made by transaction T, and $\Delta R_i'$ refers to the changed portion of $R_i$ made by transaction T'. There are three possible scenarios:

Scenario 1: If transaction T puts a table-level X lock on base relation $R_i$, transaction T' will get blocked when it tries to get either a table-level X lock or a table-level IX lock on $R_i$.

Scenario 2: If transaction T puts a table-level IX lock on base relation $R_i$, transaction T' will get blocked if it tries to get a table-level X lock on $R_1$.

Scenario 3: Suppose that transaction T puts a table-level IX lock and one or several X value locks on base relation $R_i$. Also, transaction T' tries to put a table-level IX lock and one or several X value locks on base relation $R_i$. There are two cases:

(a) $\Delta R_i \cap \Delta R_i' \neq \emptyset$ ($\Delta R_i$ intersects with, or overlaps, $\Delta R_i'$). The requirement of X value locks on $R_i$ for transaction T' will be blocked by the existing X value locks on $R_i$ that is put by transaction T, since T and T' are changing the same portion of $R_i$ (the portion that overlaps).

(b) $\Delta R_i \cap \Delta R_i' = \emptyset$ ($\Delta R_i$ does not intersect with $\Delta R_i'$). Then $\sigma(R_1 \bowtie \ldots \bowtie \Delta R_i \bowtie \ldots \bowtie R_n) \cap \sigma(R_1 \bowtie \ldots \bowtie \Delta R_i' \bowtie \ldots \bowtie R_n) = \emptyset$ In other words, the intersection of the updates to JV by transactions T and T' is empty.

Thus transaction T's writes to join view JV are not written by any other transaction T' until transaction T completes (this proves the second part of Assertion 1).

Based on a similar reasoning to the proof of Assertion 1, transaction T does not overwrite dirty data of other transactions in join view JV (this proves Assertion 2).

Suppose that transaction T reads join view JV by requiring a table-level S lock on JV. If some other transaction T' is writing any data in join view JV, T' will place a table-level Y lock (or X lock) on JV until T' completes. The required table-level S lock on JV for transaction T will be blocked by the table-level Y or X lock on JV for transaction T'. Thus transaction T does not read dirty data from transaction T' in join view JV (this proves Assertion 3). The case that transaction T tries to both read and update the join view JV can be proved similarly, since the required X lock will be blocked by the Y or X lock for transaction T'.

If transaction T reads join view JV, T will place a table-level S lock on JV until T completes. If transaction T both reads and writes join view JV, T will place a table-level X lock on JV until T completes. Thus no other transaction T' can write any data in JV until transaction T completes, since T' requires a table-level Y lock (or X lock) on JV. This proves Assertion 4.

Figure 4A:
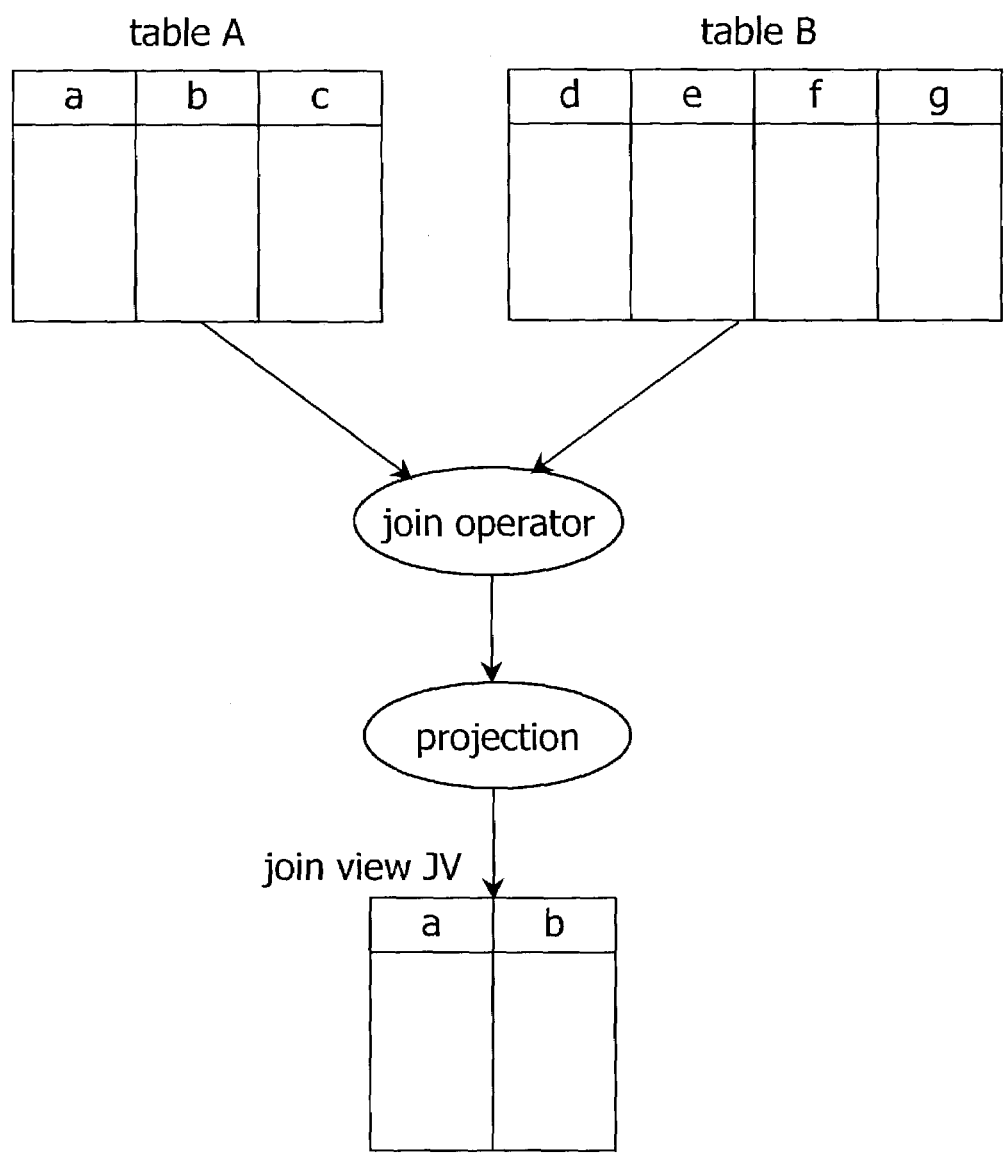

The proof for the general case where $JV = \pi(\sigma(R_1 \bowtie \ldots \bowtie R_i \bowtie \ldots \bowtie R_n))$ is discussed here. When projection is applied, less than all the attributes of the base relations $R_i$ ($1 \leq i \leq n$) will be in a join view JV based on the base relations $R_1, R_2, \ldots, R_n$. This is illustrated in FIG. 4A. In the example, the join view JV contains only attributes A.a and A.b. The other attribute A.c of relation A and attributes B.d, B.e, B.f, B.g of relation B are not in JV. In this general case, the proofs of the four assertions are the same except for the case where $\Delta R_i \cap \Delta R_i' = \emptyset$ in Assertion 1. In this case, a virtual join view $JV' = \sigma(R_1 \bowtie \ldots \bowtie R_i \bowtie \ldots \bowtie R_n)$ is defined conceptually (that is, JV' is an imaginary table that does not exist in the database system). The virtual join view is a join view without the projection applied. Therefore, JV' contains all attributes of the base relations. Each tuple in the actual join view JV comes from (and is a subset of) one tuple in JV'. Conceptually, if the tuples in JV are expanded to include all the attributes of JV', then the tuples in JV are different from each other. After computing the change $\Delta = \sigma(R_1 \bowtie \ldots \bowtie \Delta R_i \bowtie \ldots \bowtie R_n)$, for each tuple $TA_1$ in $\Delta$, there are three possible cases:

Case 1: Tuple $TA_1$ is inserted into A. This means that $\pi(TA_1)$ needs to be inserted into JV. We insert $\pi(TA_1)$ into JV. Conceptually, the expanded tuple of $\pi(TA_1)$ is $TA_1$.

Case 2: Tuple $TA_1$ is updated into $TA_2$ in $\Delta$. This means that tuple $\pi(TA_1)$ needs to be updated into $\pi(TA_2)$ in JV. A tuple $TA_3$ in JV that is equal to $\pi(TA_1)$ can be identified. Note that there may be several tuples in JV that are equal to $\pi(TA_1)$. However, conceptually, it can be thought that the expanded tuple of the identified tuple $TA_3$ is equal to $TA_1$. Then tuple $TA_3$ in JV is updated from $\pi(TA_1)$ to $\pi(TA_2)$. Conceptually, it can be thought that the expanded tuple of the updated $TA_3$ is $TA_2$.

Case 3: Tuple $TA_1$ is deleted from $\Delta$. This is similar to case 2.

For example, suppose each tuple without projection originally has three attributes (a, b, c). After projection, the tuple only contains two attributes (a, b). Suppose there are tuples T1=(1, 2, 3), T2=(1, 2, 4), and T3=(1, 5, 6). After projection, the tuples become T1'=(1, 2), T2'=(1, 2), T3'=(1, 5). Thus, the expanded tuple of T1' is T1, the expanded tuple of T2' is T2, and the expanded tuple of T3' is T3. Suppose the tuple T2=(1, 2, 4) is updated to (1, 8, 5). Then, after projection, one of the tuples (1, 2) is changed to (1, 8). However, T1' and T2' look the same. Suppose T1' is changed from (1, 2) to (1, 8). Note T2' originally comes from T2, so T2' should be changed instead of T1'. However, a distinction between T1' and T2' in JV cannot be made as they look the same. The tuples before the projection become T1=(1, 2, 3), T2=(1, 8, 5), and T3=(1, 5, 6). The tuples after projection become T1'=(1, 8), T2'=(1, 2), T3'=(1, 5).

However, conceptually, it can be thought that the expanded tuple of T1' is T2, the expanded tuple of T2' is T1, and the expanded tuple of T3' is T3. That is, conceptually it can be thought that the expanded tuple of the identified tuple, T1', is equal to tuple T2, even if T1' originally comes from tuple T1. Note tuples in the relation have no order. If the order of tuples in the relation is switched, the same relation can be obtained. Thus, if the order of T1' and T2' is switched, the tuples after projection become T1'=(1, 2), T2'=(1, 8), T3'=(1, 5). Then it can be thought that the expanded tuple of T1' is T1, the expanded tuple of T2' is T2, and the expanded tuple of T3' is T3. The key point is that tuples in the JV with the same value have no difference and thus can be treated in any way.

Thus, conceptually, $\pi(\sigma(R_1 \bowtie \ldots \bowtie \Delta R_i \bowtie \ldots \bowtie R_n)) \cap \pi(\sigma(R_1 \bowtie \ldots \bowtie \Delta R_i' \bowtie \ldots \bowtie R_n)) = \emptyset$ That is, the intersection of the updates to JV by transactions T and T' is empty. Consequently, transaction T's writes to join view JV are not written by any other transaction T' until transaction T completes (this proves part 2 of Assertion 1 for the general case).

The Y-lock locking mechanism for join views also applies to aggregate join views. An example aggregate join view AJV is created as follows:

CREATE AGGREGATE JOIN VIEW AJV AS
SELECT A.a, SUM (A.b)
FROM A, B

Figure 4B:
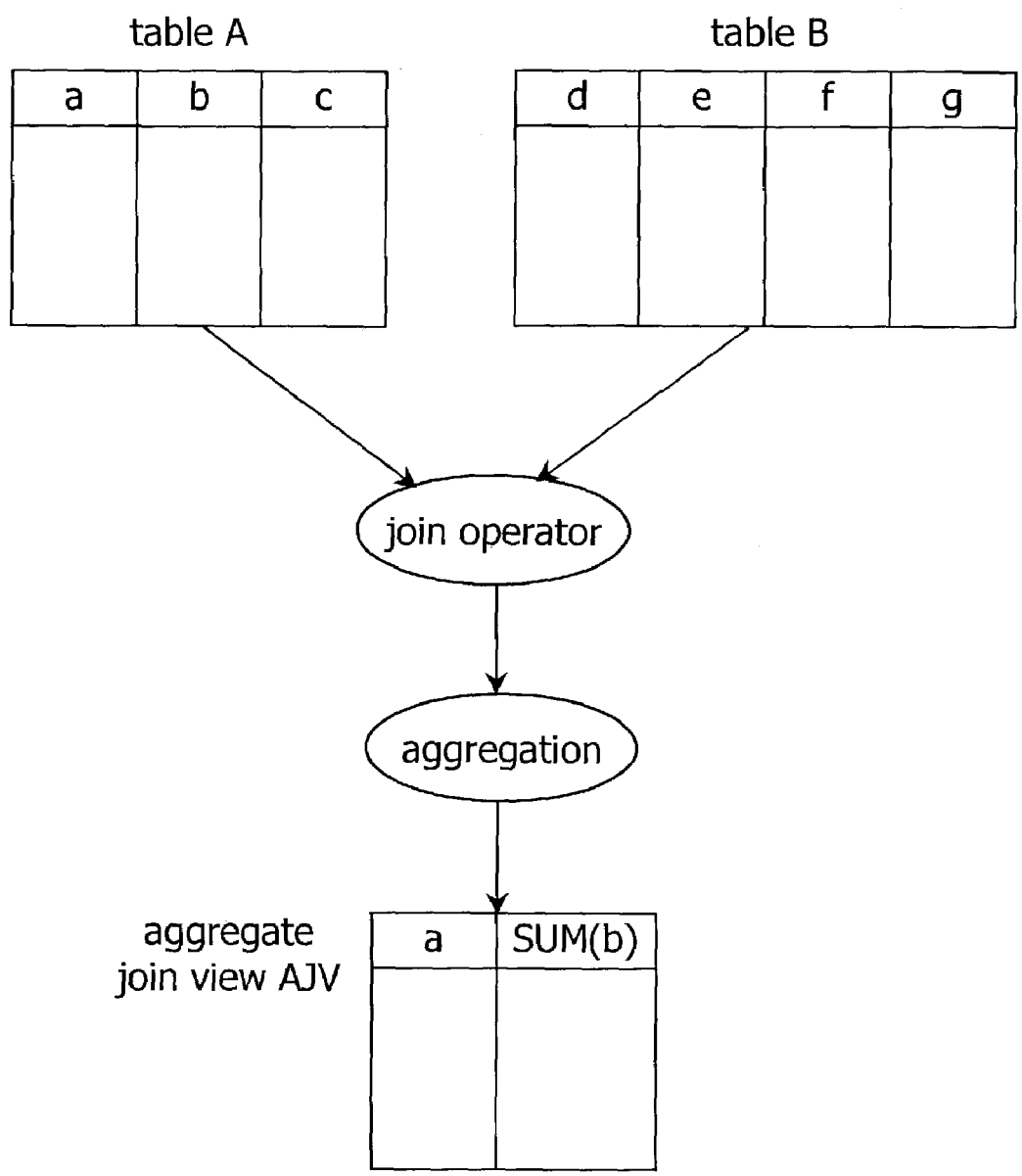

WHERE A.c=B.d
GROUP BY A.a;

As shown in FIG. 4B, the aggregate join view AJV contains an attribute A.a and a sum of the attribute A.b. SUM is one type of aggregate function, with other aggregate functions including COUNT, AVG, and so forth.

Consider an aggregate join view AJV=$\gamma(\pi(\sigma(R_1 \bowtie \ldots \bowtie R_i \bowtie \ldots \bowtie R_n)))$, where $\gamma$ is the aggregation operator. A virtual (imaginary) join view JV=$\pi(\sigma(R_1 \bowtie \ldots \bowtie R_i \bowtie \ldots \bowtie R_n))$ is defined so that AJV=$\gamma$(JV). In other words, the aggregate join view AJV is equal to the virtual join view after aggregation.

An example of this is illustrated in FIG. 4C. Assume that the schema of AJV is (A.a, SUM(B.d))—in other words, AJV has two attributes: A.a and the sum of B.d. Assume that initially AJV has one tuple (1, 3). Subsequently, as a result of a new transaction(s), join result tuples (1, 1) and (1, 5), which are results due to a join of base relations A and B, are to be inserted into AJV. The join result tuples are not inserted into new rows of AJV, but rather, the existing row in AJV is updated by summing B.d values of the join result tuples to the existing tuple of AJV. Thus, AJV is updated by updating SUM(B.d), which is 3+1+5=9. Thus, after the update, AJV has the tuple (1, 9).

For purposes of proving the assertions above, the virtual or imaginary JV remains consistent with AJV. The schema of the virtual join view JV is (a, d). Aggregation is not performed on the virtual join view JV so that the join result tuples are added into new rows of the virtual join view JV. However, note that aggregation of the virtual join view JV will cause it to result in AJV.

Thus, whenever AJV is updated by $\Delta$, conceptually, the corresponding tuples that produce $\Delta$ are updated in the virtual join view JV. By the above reasoning, if the virtual join view JV is considered instead of the aggregate join view AJV, then any parallel execution of the transactions are equivalent to some serial execution of these transactions. AJV is always set equal to $\gamma$(JV). Thus if the virtual join view JV is replaced by AJV, any parallel execution of the transactions are still equivalent to some serial execution of the transactions. This proves the four assertions above.

The main reason the above proof works is due to the fact that the addition operation for the SUM, COUNT, and AVG aggregate operators is both commutative and associative. For any tuple t in the aggregate join view AJV, all the tuples $\Delta$ producing it are kept in the virtual join view JV. Since the addition operator is both commutative and associative, tuple t can be produced from those tuples A in any order. In addition, the use of the W value lock mode guarantees that for each aggregate group, at any time at most one tuple corresponding to this group exists in the aggregate join view AJV. Thus, in the proof, focus is made on those tuples in the virtual join view JV instead of those tuples in the aggregate join view AJV. Also, the Y-lock locking mechanism avoids the problem of inserting multiple tuples of the same group into the aggregate join view by (1) using the W value lock mode, and (2) the Y locking mechanism utilizing the semantics of aggregate join views (all the tuples in the aggregate join views are produced from the tuples in the base relations).

An example is used to illustrate this proof. Suppose the schema of base relation A is (a, c), the schema of base relation B is (d, e), and the aggregate join view AJV is defined as follows:

CREATE AGGREGATE JOIN VIEW AJV AS
SELECT A.a, SUM(B.e)
FROM A, B
WHERE A.c=B.d
GROUP BY A.a;

Suppose base relation A, base relation B, aggregate join view AJV, and the virtual join view JV' originally look as shown in FIG. 13. Then tuple $t_{JV1}$ in the aggregate join view AJV is produced from tuple $t'_{JV1}$ in the virtual join view JV', with AJV=$\gamma(\pi(JV'))$.

Consider the following two transactions. Transaction T inserts tuple $t_{A2}$=(1, 5) into base relation A. To maintain the aggregate join view AJV, the join result tuple $t'_{JV2}$=(1, 5, 5, 2) is computed. Then tuple $t_{JV1}$ in the aggregate join view AJV is updated from (1, 1) to (1, 3), as shown in FIG. 14. It can be imagined that tuple $t'_{JV2}$ is inserted into the virtual join view JV'. Then tuple $t_{JV1}$ in the aggregate join view AJV is produced from tuples $t'_{JV1}$ and $t'_{JV2}$ in the virtual join view JV', with AJV=$\gamma(\pi(JV'))$.

Now a second transaction T' inserts tuple $t_{A3}$=(1, 6) into base relation A, as shown in FIG. 15. To maintain the aggregate join view AJV, the join result tuple $t'_{JV3}$=(1, 6, 6, 4) is computed. Then tuple $t_{JV1}$ in the aggregate join view AJV is updated from (1, 3) to (1, 7). It can be imagined that tuple $t'_{JV3}$ is inserted into the virtual join view JV'. Then tuple $t_{JV1}$ in the aggregate join view AJV is produced from tuples $t'_{JV1}$, $t'_{JV2}$, and $t'_{JV3}$ in the virtual join view JV', with AJV=$\gamma(\pi(JV'))$.

Note transactions T and T' update the same tuple $t_{JV1}$ in the aggregate join view AJV. At this point, if transaction T is aborted, tuple $t_{JV1}$ in the aggregate join view AJV cannot be changed back to the value (1, 1), as the current value of tuple $t_{JV1}$ is (1, 7) rather than (1, 3). However, the calculation 7-2=5 can be performed to change the value of tuple $t_{JV1}$ from (1, 7) to (1, 5). That is, the Y-lock locking mechanism uses logical undo (instead of physical undo) on the aggregate join view if the transaction holding the Y lock aborts.

Figure 5A:
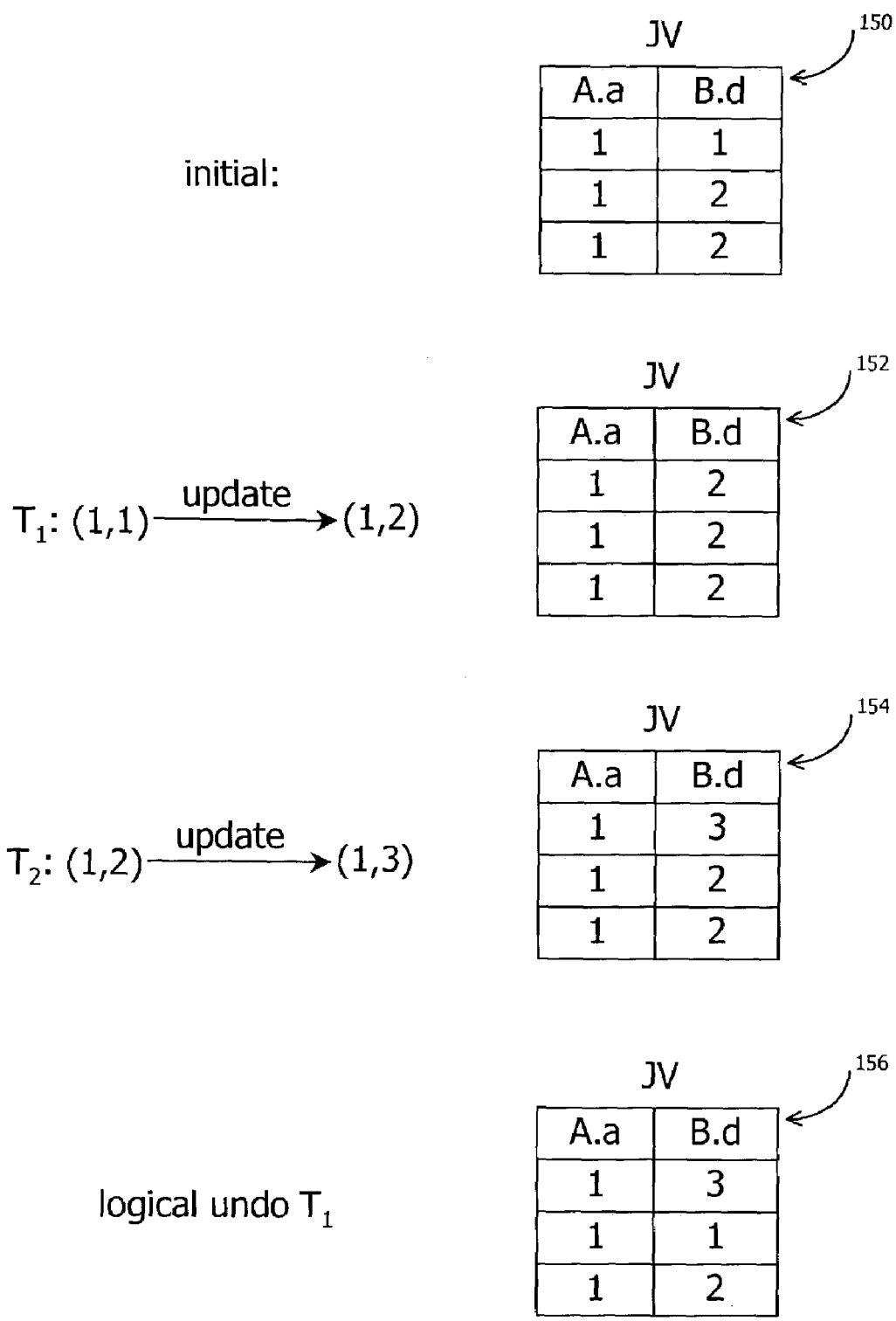

Thus, in the context of projection join views and aggregate join views, a physical undo of an update of a join view due to a first transaction ($T_1$) that aborts may not be possible. An example for projection join view is illustrated in FIG. 5A. Assume that projection JV initially contains three tuples (1, 1), (1, 2), and (1, 2), shown as 150 in FIG. 5A. In this example, the projection JV allows duplicate tuples. The scheme of JV is (A.a, B.d). Due to projection, less than all of the attributes of base relations A and B are in the projection JV.

The first transaction $T_1$ updates the tuple (1, 1) in JV to (1, 2). The modified projection JV is shown as 152, where (1, 1) has been changed to (1, 2). In the example, another transaction $T_2$ is also active. $T_2$ updates tuple (1, 2) in JV to (1, 3). The modified projection JV is shown as 154.

After the $T_2$ update, the first transaction $T_1$ aborts. In that case, the tuple (1, 2) that was changed from (1, 1) needs to be un-updated back to (1, 1). However, that tuple has already been changed to (1, 3) by transaction $T_2$, so a physical undo of that tuple is not feasible.

In accordance with some embodiments, a logical undo is performed. In the logical undo, the database system looks for another tuple in the join view JV that has the attribute values (1, 2). That other tuple is changed to the value (1, 1) for a logical undo of transaction $T_1$, shown as 156 in FIG. 5A.

A logical undo is also used for aggregate join views. As shown in FIG. 5B, assume AJV has the scheme (A.a, SUM(B.d)) and initially has the tuple (1, 5), shown as 160. Transaction $T_1$ causes a join result tuple (1, 3), with scheme (A.a, B.d), to be inserted into AJV. This causes the AJV entry to be updated to (1, 8), shown as 162. Before $T_1$ completes, $T_2$ causes a join result tuple (1, 4) to be inserted into AJV, which causes the tuple in AJV to be updated to (1, 12), shown as 164.

If $T_1$ aborts, a physical undo is not possible, since the entry (1, 8) no longer exists in AJV. Therefore, a logical undo is performed to change the tuple (1, 12) in AJV to (1, 9), shown as 166. This removes the contribution of the (1, 3) tuple for transaction $T_1$ from the AJV.

By reducing the occurrences in which transactions block each other due to locks placed on a materialized view, such as a join view, database system performance is enhanced. This is especially beneficial in a parallel database system having plural data server modules, such as that shown in FIG. 2, where the ability to perform steps of multiple transactions on separate data server modules increases database throughout. For example, a portion of one transaction that updates the join view can be performed in a first data server module concurrently with a portion of another transaction that updates the join view on a second data server module.

V. Locking Mechanism in the Presence of B-Tree Indexes Maintained for Materialized Views To enhance database system performance, indexes can be maintained on materialized views. An index is a data structure that contains an arrangement of data values of one or more attributes, usually in some predetermined order (e.g., ascending order, descending order, and so forth). Row identifiers are often associated with the attribute values in the index to enable the database system to more quickly find a row (or rows) in a table that contains a given attribute value. Examples of indexes include hash indexes, B-tree indexes, and other types of indexes. If a hash index is maintained on a materialized view, the Y-lock locking mechanism as well as the W-lock locking mechanism discussed above can be used to maintain concurrency and data integrity of the information stored in a materialized view without modification. However, if a B-tree index is used, a special mechanism needs to be implemented to avoid the "phantom problem," described further below.

As used here, a "B-tree index" generally refers to the multiple variants of the B-tree index, including the $B^+$-tree index. A B-tree index is a type of tree-indexing structure, which includes a set of linked "nodes." Each non-leaf node is of the following format: (pointer 0, key 1, pointer 1, key 2, pointer 2, ..., key n, pointer n). n may be different for each non-leaf node but is always less than some specified number. Each pointer points to a lower-level node. For any given non-leaf node in the B-tree, pointer 0 points to a sub-tree containing all keys less than key 1. For $1 \leq i \leq n-1$, pointer i points to a sub-tree containing all keys between key i and key i+1. Pointer n points to a sub-tree containing all keys greater than key n. The highest level node in the B-tree is its root, which points to children nodes, which in turn may point to more children nodes depending on the depth of the tree. The lowest level nodes have no children, and these nodes are referred to as "leaf nodes." Each leaf node of a B-tree holds one or multiple entries (up to some specified maximum number). Each entry in the leaf node is of the following format: (key value, a list of row identifiers). Each row identifier points to a row of a table (such as a materialized view) on which the B-tree index is maintained and the indexed attribute(s) of the row has the corresponding key value. Alternatively, each entry in the leaf can also be of the following format: (key value, list of rows). In this alternative format, the "list of rows" refers to the actual rows being stored in the B-tree index. In the following discussion, the focus will be on B-tree indexes according to the first format. Note that embodiments of the invention can be used with B-tree indexes according to the latter format.

As noted above, when using a B-tree index with a materialized view, a phantom problem may occur under certain circumstances. Basically, the phantom problem occurs when one transaction requests the retrieval of rows containing key values within a specified range, while another transaction that is running concurrently performs some type of update (insertion, deletion, or modification) of a row containing a key value within the specified range. To address the phantom problem, conventional database systems have employed a key-range locking technique, including a previous-key locking technique or a next-key locking technique. The basic idea of a previous-key locking technique is to lock both the current key and the previous key when locking of a range of keys is requested. Similarly, for next-key locking, both the current key and the next key is locked when locking of a key range is performed. However, conventional key-range locking techniques cannot be extended to the Y-lock locking mechanism and/or W-lock locking mechanism without modification. In accordance with some embodiments of the invention, a key-range locking mechanism that employs Y locks, W locks, and other locks (e.g., X lock, S lock) is provided.

As discussed above, with the Y-lock locking mechanism, Y locks are used to replace X locks when a view is updated. An important property of Y locks is that they do not conflict with each other while they do conflict with S and X locks. The main reason that Y locks work for views is due to the fact that the addition operation for each of the COUNT, SUM, and AVG aggregate operators is both commutative and associative. However, Y locks allow multiple transactions to concurrently update the same tuple in an aggregate join view AJV. This may lead to an undesirable phenomenon resulting from the insertion/deletion of data into or from aggregate join views.

This undesirable phenomenon is explained in the context of the following example. Suppose the schema of the aggregate join view AJV is (a, b, SUM(c)). A B-tree index $I_B$ is built on attribute a of the aggregate join view AJV. There is no index on attributes (a, b) of the aggregate join view AJV. Also, assume there is no tuple with attribute a=1 and b=2 in the aggregate join view AJV. Consider the following two transactions T and T'. Transaction T integrates a new join result tuple (1, 2, 3) into the aggregate join view AJV (by insertion into some base relation of AJV). Transaction T' integrates another new join result tuple (1, 2, 4) into the aggregate join view AJV (by insertion into some base relation of AJV).

It is also assumed that Y value locks are used (instead of X value locks), with the two transactions T and T' executed in the following way:

(1) Transaction T gets a Y value lock for a=1 on the B-tree index $I_B$ of AJV. Transaction T searches the row ID list (lists of row identifiers) in the entry for a=1 of the B-tree index $I_B$. Transaction T finds that no tuple $t_2$ whose attributes $t_2.a=1$ and $t_2.b=2$ exists in AJV.

(2) Transaction T' gets a Y value lock for a=1 on the B-tree index $I_B$ of AJV. Transaction T' searches the row ID list in the entry for a=1 of the B-tree index $I_B$. Transaction T' finds that no tuple $t_2$ whose attributes $t_2.a=1$ and $t_2.b=2$ exists in AJV.

(3) Transaction T inserts a new tuple $t_1=(1, 2, 3)$ into AJV. Also, transaction T inserts the row ID of tuple $t_1$ into the row ID list in the entry for a=1 of the B-tree index $I_B$.

(4) Transaction T' inserts a new tuple $t_3=(1, 2, 4)$ into AJV. Also, transaction T' inserts the row ID of tuple $t_3$ into the row ID list in the entry for a=1 of the B-tree index $I_B$.

Now the aggregate join view AJV contains two tuples (1, 2, 3) and (1, 2, 4) instead of a single tuple (1, 2, 7), which is not correct. As discussed above in Section III, the same undesirable phenomenon occurs when Y locks are used with an aggregate join view AJV on which either no index or a hash index is maintained.

To address the issue of multiple tuples in the AJV that belong to the same group, Y locks are augmented with short-term W locks, as discussed above. Thus, there are four kinds of (value) locks according to some embodiments: S, X, Y, and W. S locks are used for reads. X locks are used for both reads and writes. Y locks and W locks are used for writes. If no index exists on the aggregate join view AJV, these locks are table-level locks. If a hash index exists on the aggregate join view AJV, these locks are value locks. If a B-tree index exists on the aggregate join view AJV, these locks are key range locks.

Because Y locks are compatible with themselves, special care must be used when implementing key range locking, as illustrated by the following example. Suppose the schema of the aggregate join view AJV is (a, SUM(b)), and a B-tree index is built on attribute a of the aggregate join view AJV. Also, suppose originally the aggregate join view AJV contains four tuples that correspond to a=2, a=3, a=4, and a=5. Consider the following three transactions T, T', and T" on the aggregate join view AJV. Transaction T deletes the tuple whose attribute a=3 (by deletion from some base relation of AJV). Transaction T' deletes the tuple whose attribute a=4 (by deletion from some base relation of AJV). Transaction T" reads those tuples whose attribute a is between 2 and 5. One technique to implement Y and W value locks on the B-tree index and the three transactions T, T', and T" is as follows.

As shown in FIG. 16, transaction T places a Y lock for a=3 and another Y lock for a=4 on the aggregate join view AJV. The lock placed on the attribute a=4 is a next key lock (a type of key range lock). Next, transaction T' places a Y lock for a=4 and another Y lock for a=5 on the aggregate join view AJV, as shown in FIG. 17. Again, the lock on a=5 is a next key lock. Transaction T' then deletes the entry for a=4 from the B-tree index. Transaction T' commits and releases the two Y locks for a=4 and a=5, as shown in FIG. 18.

Figures 19, 20:
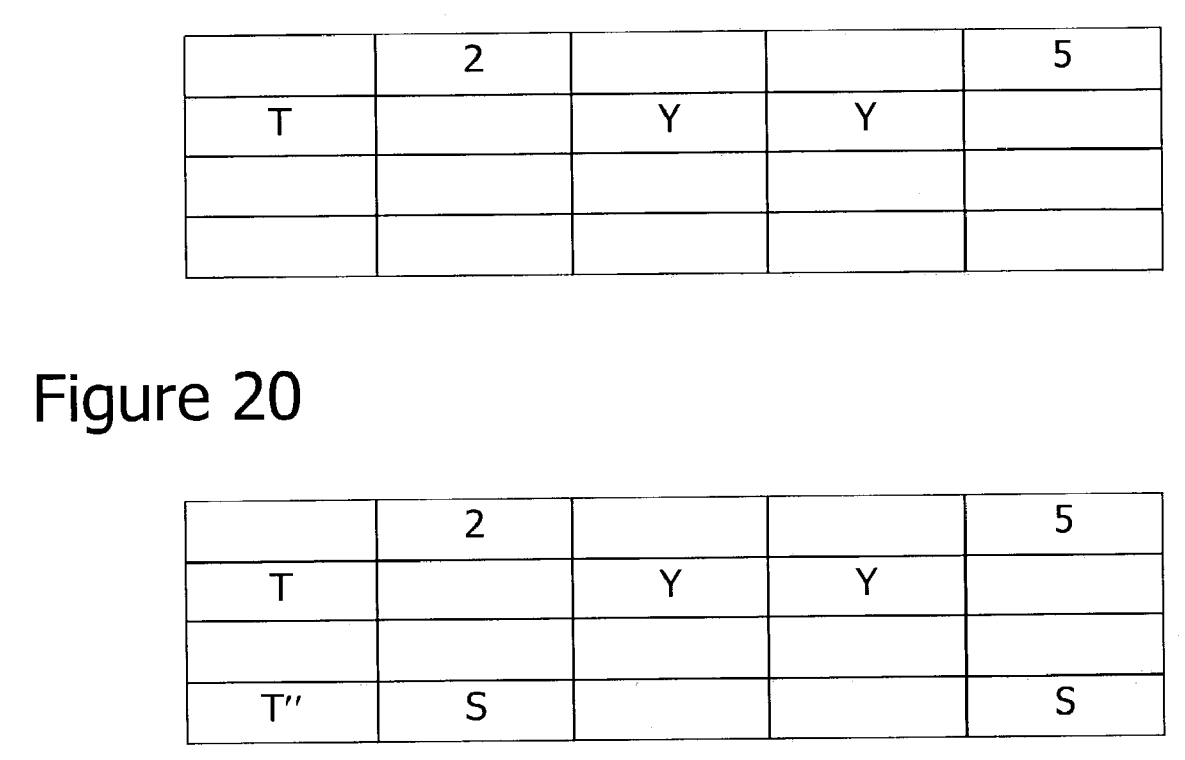

Then transaction T deletes the entry for a=3 from the B-tree index, as shown in FIG. 19. Before transaction T finishes execution, transaction T" finds the entries for a=2 and a=5 in the B-tree index. Transaction T" then places an S lock for a=2 and another S lock for a=5 on the aggregate join view AJV, as shown in FIG. 20. In this manner, transaction T" can start execution even before transaction T finishes execution. Recall that transaction T" reads rows with a in the range between 2 and 5, which means that T" will see the row where a=3 in the AJV. This is incorrect, because there is a write-read conflict between transaction T and transaction T" (on the tuple whose attribute a=3). The reason that T and T" are allowed to concurrently access AJV is because Y locks are compatible with themselves. Thus, with Y locks, key range locking does not prevent read-write conflicts from occurring when a B-tree index is maintained on an aggregate join view.

To implement Y and W value locks on aggregate join views associated with B-tree indices correctly, a modified form of key range locking is implemented along with logical deletion of keys. There are various operations that require placing locks on a B-tree index associated with a materialized view. A first operation is the fetch operation. In the fetch operation, given a key value $v_1$, the row identifier(s) associated with the key value $v_1$ is retrieved from the B-tree index if the key value $v_1$ exists in the B-tree index. For example, a read operation may request a row that contains the key value $v_1$, in which case the fetch operation is performed. Another operation is the fetch next operation. In the fetch next operation, given a current key value $v_1$, the next key value $v_2 > v_1$ that exists in the B-tree index is located, and the row identifier(s) associated with the key value $v_2$ is fetched. A fetch next operation is performed when a read request is received that requests rows containing key values between a certain range, such as between $v_1$ and $v_1+10$. In this example, if the key $v_1$ exists in the B-tree index, then a fetch operation is used to fetch the row identifier(s) associated with the key value $v_1$. To obtain the remaining row identifiers in the B-tree index associated with key values within the specified range, one or more fetch next operations are invoked to fetch the row identifiers of key values that are greater than $v_1$ in the specified range.

Other operations require that an X value lock be placed on the key value $v_1$. The X value lock is placed on key value $v_1$ if a transaction requests both a read and a write of rows containing the key value $v_1$. Some other operations cause a Y value lock to be placed on key value $v_1$. A Y value lock is placed on the key value $v_1$ in response to request to insert, delete, or update rows containing the key value $v_1$. Other operations cause a W value lock to be placed on key value $v_1$. A W value lock is placed on key value $v_1$ in response to requests to integrate a new row into the materialized view.

Thus, there are 5 operations of interest that involve placement of locks on the B-tree index: a fetch operation; a fetch next operation; placing an X value lock on a given key value; placing a Y value lock on a given key value; and placing a W value lock on a given key value.

The following provides examples of what occurs in response to insert and delete transactions. Assume a B-tree index is built on an attribute a of the aggregate join view AJV, and a row is inserted into some base relation of AJV. The insertion of this row into the base relation of AJV causes a new join result tuple T to be integrated into the aggregate join view AJV. The procedure to integrate the join result tuple T into the aggregate join view AJV is as follows. If the aggregate group of tuple T exists in AJV (which is determined by reading the B-tree index and AJV by using the fetch operation), then the aggregate group of AJV is updated based on information in the join result tuple T. However, if the aggregate group of tuple T does not exist in AJV, then a new aggregate group is inserted into AJV for tuple T. The database system does not know whether it needs to update an existing aggregate group in AJV or insert a new aggregate group into AJV until the database system reads from AJV. A W value lock for T.a is placed on the aggregate join view AJV to integrate tuple T into AJV.

Another transaction is a delete transaction that involves deleting a tuple of some base relation of AJV. For each such join result tuple T, the following is performed to remove tuple T from the aggregate join view AJV. First, the aggregate group of tuple T in AJV is located (by reading the B-tree index and AJV using the fetch operation). The aggregate group in AJV is then updated. If all join result tuples have been removed from the aggregate group, then the aggregate group is deleted from the AJV. In this case, the database system does not know whether it needs to update an aggregate group in the AJV or delete an aggregate group from the AJV in advance. However, the database system knows that it needs to acquire a Y value lock for T.a on the AJV before the database system can remove tuple T from the aggregate join view AJV.

Other transactions will invoke one or more of the five operations discussed above.

Figure 21:
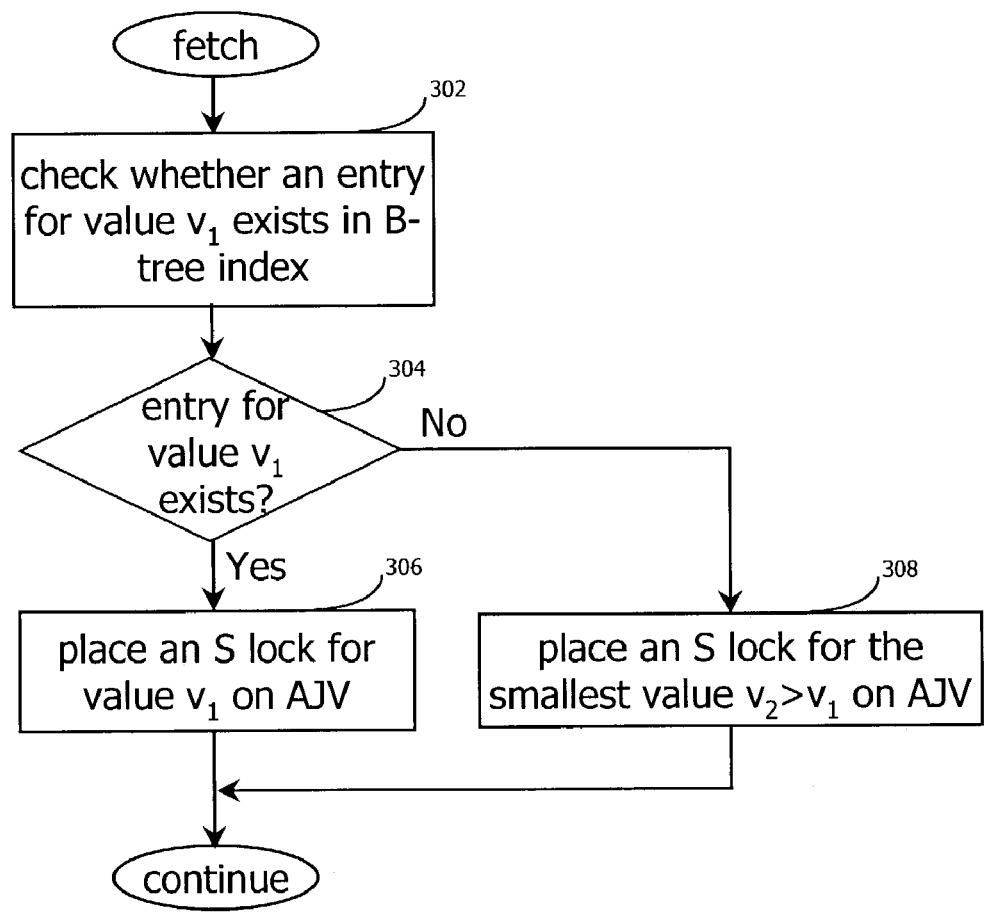
FIG. 21 is a flow diagram of a fetch operation.

A locking algorithm for implementing value locks for aggregate join views on B-tree indices is implemented as follows, in accordance with one embodiment. Reference is made primarily to next key locking in the following discussion. However, note that previous key locking can be used in other embodiments. As shown in FIG. 21, in a fetch operation of rows containing value $v_1$, the database system checks (at 302) whether some entry for value $v_1$ exists in the B-tree index. If such an entry exists, as determined (at 304), an S lock for value $v_1$ is placed (at 306) on the aggregate join view AJV. If no entry for value $v_1$ exists in the B-tree index, then an S lock for value $v_2$ is placed (at 308) on the aggregate join view AJV for the smallest value $v_2$ where $v_2 > v_1$. This is a modified form of key range locking, and more specifically, next key locking. If previous key locking is employed, then the S lock for value $v_2$ is placed for the largest value $v_2$ where $v_2 < v_1$. In the modified form of key range locking, an S lock is placed on the next key (or previous key) only if the entry for $v_1$ does not exist in the B-tree index.

Figure 22:
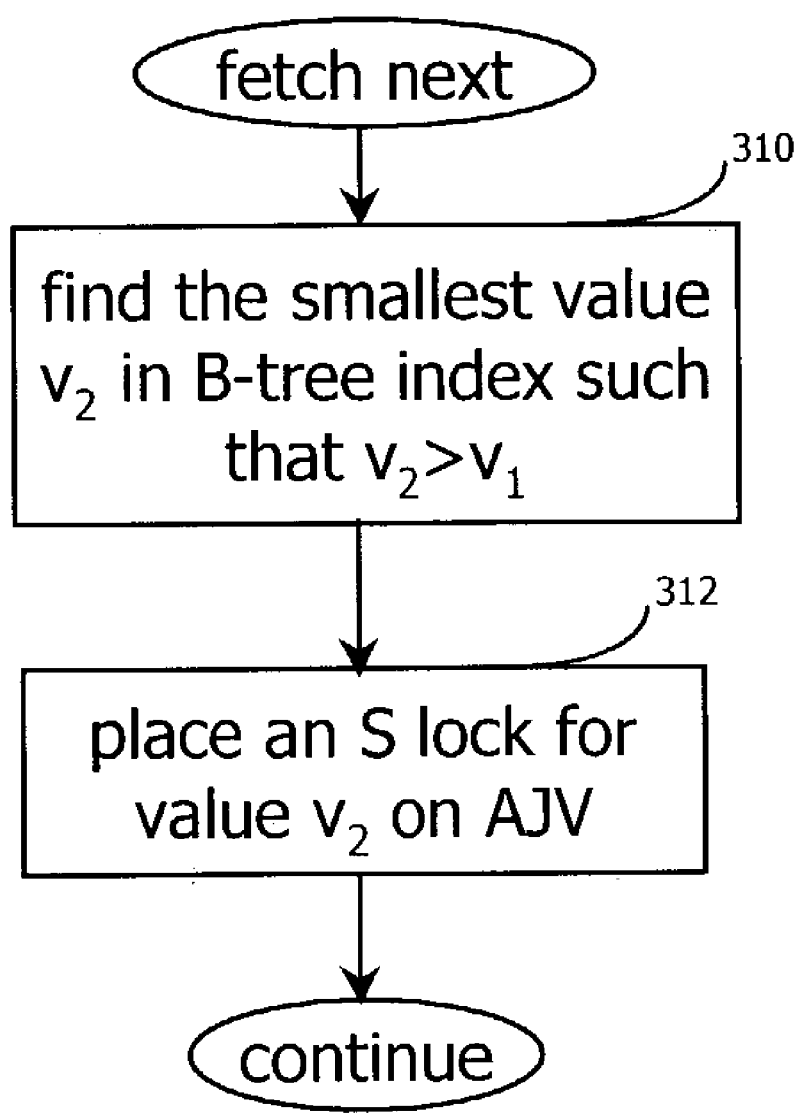
FIG. 22 is a flow diagram of a fetch next operation.

As shown in FIG. 22, for a fetch next operation, the database system finds (at 310) the smallest value $v_2$ in the B-tree index such that $v_2 > v_1$. An S lock for value $v_2$ is placed (at 312) on the aggregate join view AJV.

Figure 23:
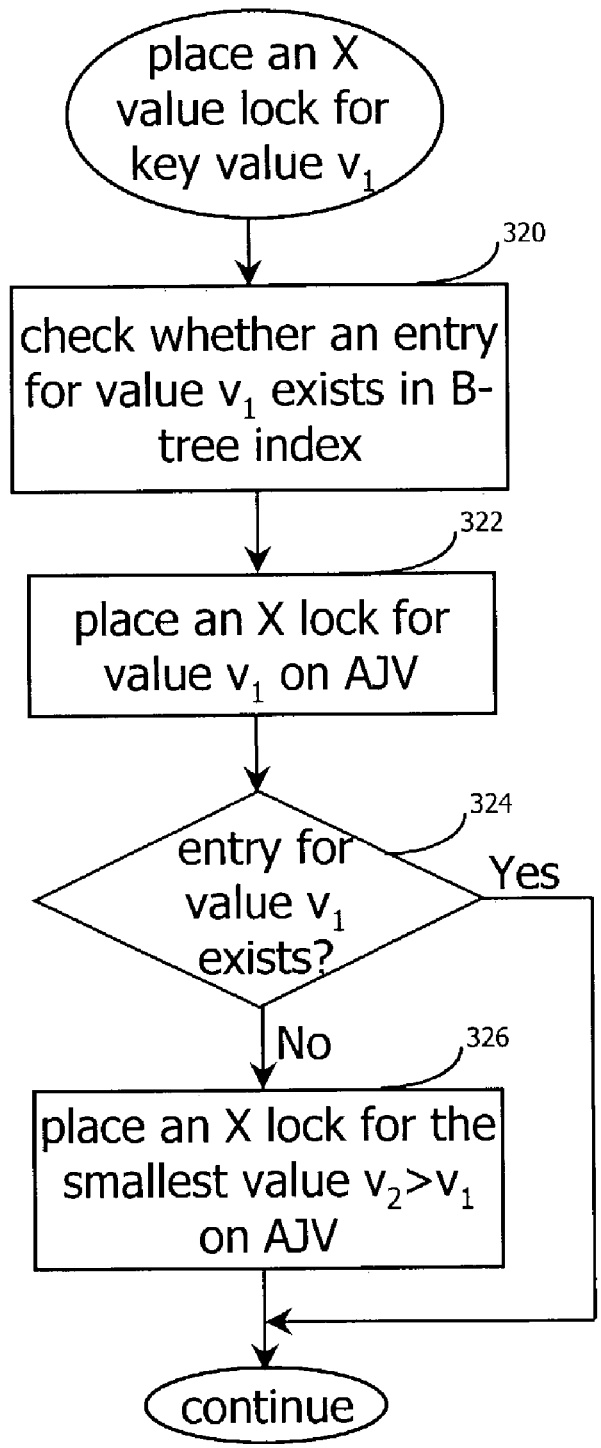
FIG. 23 is a flow diagram of an operation that places an exclusive (X) lock on an aggregate join view.

As shown in FIG. 23, in an operation that involves placing an X value lock for a key value $v_1$, the database system first checks (at 320) whether there is some entry for value $v_1$ in the B-tree index. In any event, an X lock for value $v_1$ is placed (at 322) on the aggregate join view AJV. If no entry for value $v_1$ exists in the B-tree index, as determined (at 324), an X lock for value $v_2$ is placed (at 326) on the aggregate join view AJV for the smallest value $v_2$ where $v_2 > v_1$.

Figure 24:
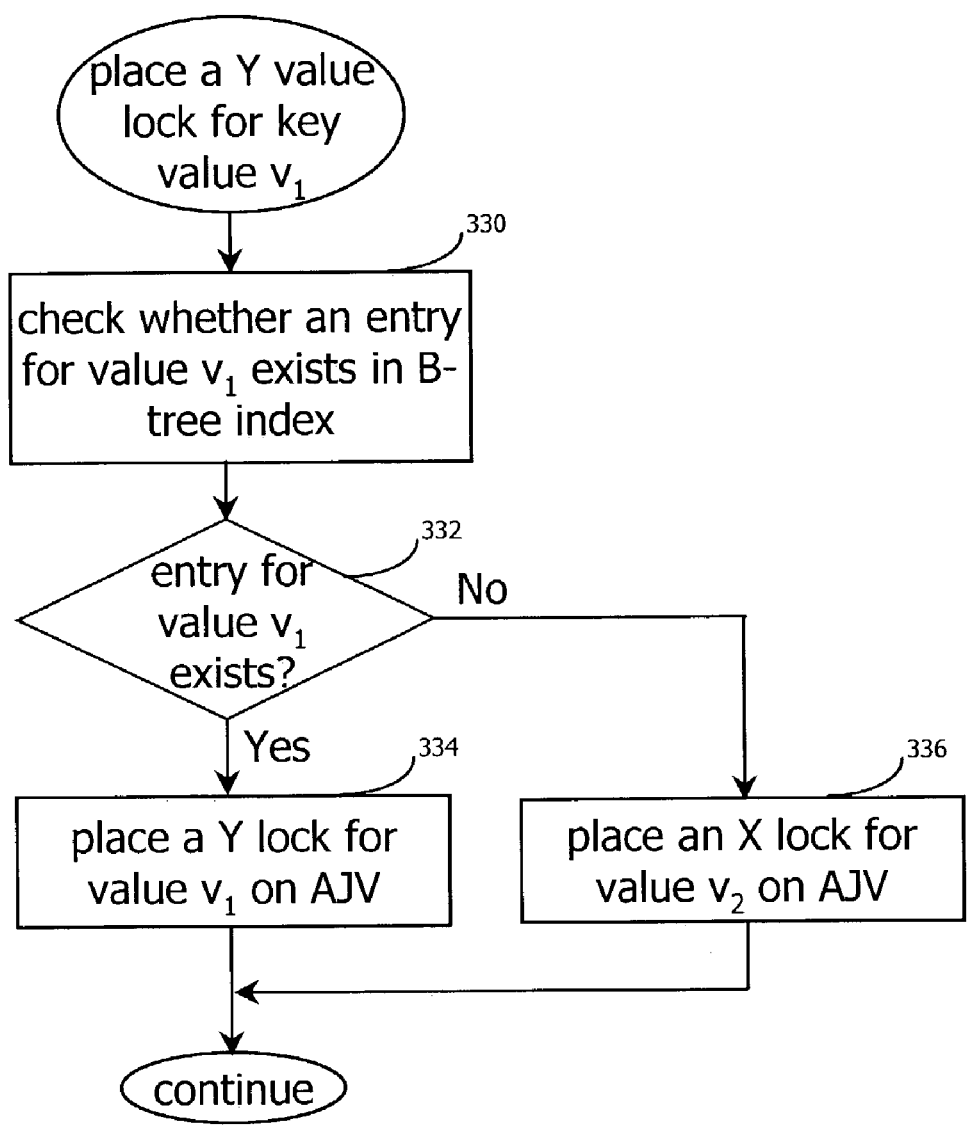
FIG. 24 is a flow diagram of an operation that places a modified-exclusive (Y) lock on an aggregate join view.

Another possible operation in the database system is the operation that involves placing a Y lock for a key value $v_1$, as shown in FIG. 24. In this case, the database system checks (at 330) whether some entry for value $v_1$ exists in the B-tree index. If such an entry exists, as determined (at 332), a Y lock for value $v_1$ is placed (at 334) on the aggregate join view AJV. However, if no entry for value $v_1$ exists in the B-tree index, then an X (not Y) lock for value $v_2$ is placed (at 336) on the aggregate join view AJV for the smallest value $v_2$ where $v_2 > v_1$.

Figure 25:
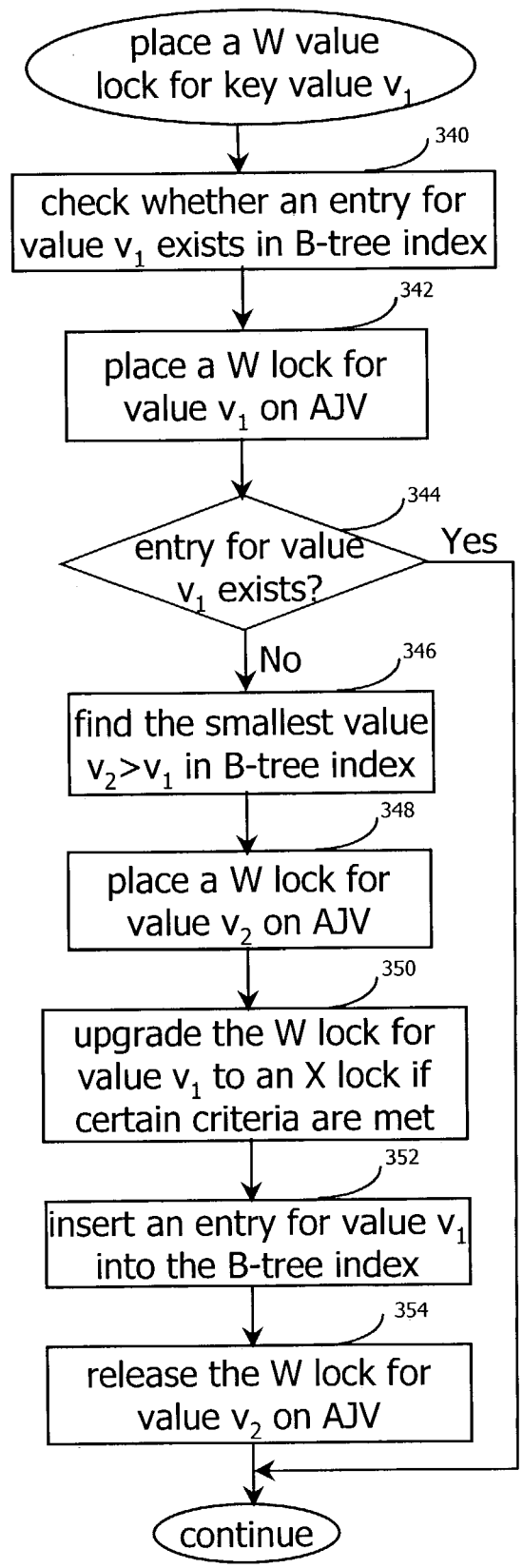
FIG. 25 is a flow diagram of an operation that places a short-term W lock on an aggregate join view.

Yet another operation that can occur in a database system is an operation that requires a W value lock to be placed for key value $v_1$, as shown in FIG. 25. In this case, the database system checks (at 340) whether some entry for value $v_1$ exists in the B-tree index. In either case, a short-term W lock for value $v_1$ is placed on the aggregate join view AJV. However, if no entry for value $v_1$ exists in the B-tree index, as determined (at 344), then the following operations are performed. The database system finds (at 346) the smallest value $v_2$ in the B-tree index such that $v_2 > v_1$. A short-term W lock for value $v_2$ is the placed (at 348) on the aggregate join view AJV. If the W lock for value $v_2$ on the B-tree index is acquired as an X lock, the database system upgrades (at 350) the W lock for value $v_1$ on the aggregate join view AJV to an X lock. This situation may happen when transaction T already holds an S or X lock for value $v_2$ on the aggregate join view AJV.

Next, the database system inserts (at 352) into the B-tree index an entry for value $v_1$ with an empty row ID list. The short-term W lock is then released (at 354) for value $v_2$ on the aggregate join view AJV. Note that at a later time, transaction T will insert a row identifier into this row ID list after transaction T inserts the corresponding tuple into the aggregate join view AJV.

Table 3 summarizes the locks acquired during the different operations discussed above (assuming next key locking is performed).

TABLE 3

| | | current key $v_1$ | next key $v_2$ |
|---|---|---|---|
| fetch | $v_1$ exists | S | |
| | $v_1$ does not exist | | S |
| fetch next | | | S |
| X value lock | $v_1$ exists | X | |
| | $v_1$ does not exist | X | X |
| Y value lock | $v_1$ exists | Y | |
| | $v_1$ does not exist | | X |
| W value lock | $v_1$ exists | W | |
| | $v_1$ does not exist and the W lock on $v_2$ is acquired as a W lock | W | W |
| | $v_1$ does not exist and the W lock on $v_2$ is acquired as an X lock | X | X |

During the period that a transaction T holds a Y (or W, or X) value lock for key value $v_1$, if transaction T desires to delete the entry for value $v_1$, transaction T performs a logical deletion of keys from the B-tree index instead of a physical deletion. In other words, instead of removing the entry for value $v_1$ from the B-tree index, the database system leaves the entry for value $v_1$ in the B-tree index, but sets a flag (referred to as DELETE_FLAG). In one implementation, the DELETE_FLAG indicator is set to a logical 1 value. If the delete is to be rolled back, e.g., transaction T is terminated for some reason, then the DELETE_FLAG indicator is reset (e.g., to the logical value 0). When DELETE_FLAG is set, if another transaction inserts an entry for value $v_1$ into the B-tree index before the entry for value $v_1$ is removed, the DELETE_FLAG indicator for the value $v_1$ is reset to 0.

The physical deletion of keys is performed as "garbage collection" by other operations (of other transactions) that happen to pass through the affected nodes (i.e., nodes with DELETE_FLAG set) in the B-tree index. This process of physically deleting from a node those entries marked with a set DELETE_FLAG is referred to as node reorganization. A node reorganization removes all entries from a leaf node of a B-tree index that have been marked deleted and currently no transaction holds any lock on such entries.

In accordance with some embodiments of the invention, a special short-term Z lock mode is implemented to enable the deletion of entries that are marked with a set DELETE_FLAG. A Z lock mode is not compatible with any lock mode (including itself). A transaction T can get a Z lock on an object if no transaction (including transaction T itself) is currently holding any lock on the object. Also, during the period that transaction T holds a Z lock on an object, no transaction (including transaction T itself) can be granted another lock (including Z lock) on this object.

Note that Z lock mode is different from the X lock mode. For example, if transaction T itself is currently holding an S lock on an object, transaction T can still get an X lock on the object if no other transaction is currently holding any lock on the object. On the other hand, once a transaction T is holding an S lock on an object, it cannot obtain an Z lock on the object.

For each entry with value v whose DELETE_FLAG is set to 1, a conditional Z lock for value v is requested. If the conditional Z lock request is granted, this entry is deleted from the leaf node of the B-tree index. After deletion of the entry, the Z lock is released. However, if the conditional Z lock request is denied, nothing further is done with the entry. The physical deletion of this entry is left to other future operations.

The Z lock (instead of X lock) is used to prevent the following undesirable situation from occurring. A transaction that is currently using an entry (e.g., holding an S lock on the entry), where the entry is marked logically deleted, tries to physically delete the entry. Use of the Z lock mode simplifies the key-range locking protocol for aggregate join views on B-tree indices.

As a further note, in operations that require a Y value lock on key value $v_1$, the situation where no entry for value $v_1$ exist in the B-tree index does not occur often. To illustrate this, consider an aggregate join view AJV that is defined on base relation R and several other base relations. Suppose a B-tree index $I_B$ is built on attribute d of the aggregate join view AJV. If a new tuple t is inserted into base relation R and several new join result tuples are generated, the corresponding transaction needs to acquire appropriate W value locks on the B-tree index $I_B$ before the transaction can integrate these new join result tuples into the aggregate join view AJV. If the transaction deletes a tuple t from base relation $R_1$ to maintain the aggregate join view AJV, normally the transaction needs to first compute the corresponding join result tuples that are to be removed from the aggregate join view AJV. These join result tuples must have been integrated into the aggregate join view AJV before. Thus, when the transaction acquires Y value locks for their d attribute values, these d attribute values usually are present in the B-tree index $I_B$. However, there is an exception. Suppose attribute d of the aggregate join view AJV comes from base relation R, and there is only one tuple t in base relation R whose attribute d=v. However, there is no matching tuple in the other base relations of the aggregate join view AJV that can be joined with tuple t. Thus, there is no tuple in the aggregate join view AJV whose attribute d=v. Suppose transaction T executes the following SQL statement:

DELETE
FROM R
WHERE R.d=v;

In this case, to maintain the aggregate join view AJV, there is no need for transaction T to compute the corresponding join result tuples that are to be removed from the aggregate join view AJV. Transaction T can execute the following operation directly:

DELETE
FROM AJV
WHERE AJV.d=v;

Then when transaction T requests a Y value lock for d=v on the B-tree index $I_B$, transaction T will find that no entry for value v exists in the B-tree index $I_B$. In this case, transaction T has another choice—requesting an X (instead of Y) value lock for d=v on the B-tree index $I_B$.

The following describes examples where, if the techniques discussed above are not used, then serializability cannot be guaranteed. As mentioned above, when placing a Y value lock for key value $v_1$, an X lock (instead of a Y lock) for value $v_2$ is placed on the aggregate join view AJV if the value $v_1$ does not exist on the B-tree index. To illustrate the reason for this, the following example is provided. Suppose originally the aggregate join view AJV contains only one tuple that corresponds to a=4. Consider the following three transactions T, T', and T" on the aggregate join view AJV. The schema of the aggregate join view AJV is (a, SUM (b)), and a B-tree index is built on attribute a of the aggregate join view AJV.

Transaction T deletes the tuple whose attribute a=2. Transaction T' integrates two new join result tuples (2, 5) and (3, 6) into the aggregate join view AJV. Transaction T" reads those tuples whose attribute a is between 1 and 3. Suppose a Y lock (instead of an X lock) is placed for value $v_2$ on the B-tree index. Also, suppose the three transactions T, T', and T" are executed in the following way. Transaction T finds the entry for a=4 in the B-tree index, and transaction T places a Y lock for a=4 on the aggregate join view AJV, as shown in FIG. 26. Transaction T' then places a W lock for a=2 and another W lock for a=4 on the aggregate join view AJV, as shown in FIG. 27. Next, transaction T' inserts the tuple (2, 5) and an entry for a=2 into the aggregate join view AJV and the B-tree index, respectively. Transaction T' downgrades the two W locks for a=2 and a=4 on the aggregate join view AJV to Y locks, as illustrated in FIG. 28. Then, transaction T' places a W lock for a=3 and another W lock for a=4 on the aggregate join view AJV, as illustrated in FIG. 29.

Next, transaction T' inserts the tuple (3, 6) and an entry for a=3 into the aggregate join view AJV and the B-tree index, respectively. Transaction T' downgrades the two W locks for a=3 and a=4 on the aggregate join view AJV to Y locks, as shown in FIG. 30. Transaction T' then commits and releases the three Y locks for a=2, a=3, and a=4, as shown in FIG. 31.

Transaction T then deletes the entry for a=2 from the B-tree index, as shown in FIG. 32. Before transaction T finishes execution, transaction T" finds the entries for a=3 and a=4 in the B-tree index. Transaction T" places an S lock for a=3 on the aggregate join view AJV, as shown in FIG. 33. In this way, transaction T" can start execution even before transaction T finishes execution, which is incorrect, because there is a write-read conflict between transaction T and transaction T" on the tuple whose attribute a=2.

Similar examples can be developed to illustrate why the other techniques discussed above are needed to maintain data integrity.

The following briefly explains the correctness (serializability) of the key-range locking algorithm for aggregate join views on B-tree indices as described above. Suppose a B-tree index $I_B$ is built on attribute d of an aggregate join view AJV. For any value v, it can be shown below that there is no read-write or write-read conflict between two different transactions on those tuples of the aggregate join view AJV whose attribute d has value v. Write-write conflicts are avoided by the locks on the base relations and the commutative and associative properties of the addition operation. In particular, the use of W locks guarantees that for each aggregate group, at any time, at most one tuple corresponding to this group exists in the aggregate join view AJV.

Consider the following two transactions T and T'. Transaction T updates (some of) the tuples in the aggregate join view AJV whose attribute d has value $v_1$. Transaction T' reads the tuples in the aggregate join view AJV whose attribute d has value $v_1$ (e.g., through a range query). Assume $v_2$ is the smallest existing value in the B-tree index $I_B$ such that $v_2 > v_1$. Transaction T needs to get a Y (or W, or X) value lock for d=$v_1$ on the B-tree index $I_B$ of AJV. Transaction T' needs to get an S value lock for d=$v_1$ on the B-tree index $I_B$ of AJV. There are four possible cases:

Case 1: An entry E for value $v_1$ already exists in the B-tree index $I_B$. Also, transaction T' gets the S value lock for d=$v_1$ on the B-tree index $I_B$ of AJV first. To put an S value lock for d=$v_1$ on the B-tree index $I_B$, transaction T' needs to put an S lock for $d=v_1$ on AJV. During the period that transaction T' holds the S lock for $d=v_1$ on AJV, the entry E for value $v_1$ always exists in the B-tree index $I_B$. Then during this period, transaction T cannot get the Y (or W, or X) lock for $d=v_1$ on AJV. That is, transaction T cannot get the Y (or W, or X) value lock for $d=v_1$ on the B-tree index $I_B$ of AJV.

Case 2: An entry E for value $v_1$ already exists in the B-tree index $I_B$. Also, transaction T gets a Y (or W, or X) value lock for $d=v_1$ on the B-tree index $I_B$ of AJV first. To put a Y (or W, or X) value lock for $d=v_1$ on the B-tree index $I_B$, transaction T needs to put a Y (or W, or X) lock for $d=v_1$ on AJV. During the period that transaction T holds the Y (or W, or X) lock for $d=v_1$ on AJV, the entry E for value $v_1$ always exists in the B-tree index $I_B$. Note during this period, if some transaction deletes the entry E for value $v_1$ from the B-tree index $I_B$, the entry E is only logically deleted. Only after transaction T releases the Y (or W, or X) lock for $d=v_1$ on AJV may the entry E for value $v_1$ be physically deleted from the B-tree index $I_B$. Thus, during the period that transaction T holds the Y (or W, or X) lock for $d=v_1$ on AJV, transaction T' cannot get the S lock for $d=v_1$ on AJV. That is, transaction T' cannot get the S value lock for $d=v_1$ on the B-tree index $I_B$ of AJV.

Case 3: No entry for value $v_1$ exists in the B-tree index $I_B$. Also, transaction T' gets the S value lock for $d=v_1$ on the B-tree index $I_B$ of AJV first. To put an S value lock for $d=v_1$ on the B-tree index $I_B$, transaction T' needs to put an S lock for $d=v_2$ on AJV. During the period that transaction T' holds the S lock for $d=v_2$ on AJV, no other transaction T" can insert an entry for value $v_3$ into the B-tree index $I_B$ such that $v_1 \leq v_3 \leq v_2$. This is because to do so, transaction T" needs to get a W (or X) lock for $d=v_2$ on AJV. Then during the period that transaction T' holds the S lock for $d=v_2$ on AJV, transaction T cannot get the Y (or W, or X) value lock for $d=v_1$ on the B-tree index $I_B$ of AJV. This is because to do so, transaction T needs to get an X (or W, or X) lock for $d=v_2$ on AJV. Note if transaction T' itself inserts an entry for value $V_3$ into the B-tree index $I_B$ such that $v_1 \leq v_3 \leq v_2$, transaction T' will hold an X lock for $d=v_3$ on AJV. Then transaction T still cannot get the Y (or W, or X) value lock for $d=v_1$ on the B-tree index $I_B$ of AJV before transaction T' finishes execution.

Case 4: No entry for value $v_1$ exists in the B-tree index $I_B$. Also, transaction T gets the Y (or W, or X) value lock for $d=v_1$ on the B-tree index $I_B$ of AJV first. In this case, there are three possible scenarios:

(a) Transaction T gets the Y value lock for $d=v_1$ on the B-tree index $I_B$ of AJV first. Thus, transaction T puts an X lock for $d=v_2$ on AJV. During the period that transaction T holds the X lock for $d=v_2$ on AJV, no other transaction T" can insert an entry for value $v_3$ into the B-tree index $I_B$ such that $v_1 \leq v_3 < v_2$. This is because to do so, transaction T" needs to get a W (or X) lock for $d=v_2$ on AJV. Then during the period that transaction T holds the X lock for $d=v_2$ on AJV, transaction T' cannot get the S value lock for $d=v_1$ on the B-tree index $I_B$ of AJV. This is because to do so, transaction T' needs to get an S lock for $d=v_2$ on AJV.

(b) Transaction T gets the W value lock for $d=v_1$ on the B-tree index $I_B$ of AJV first. Thus, transaction T puts a W lock for $d=v_1$ and another W lock for $d=v_2$ on AJV. Also, transaction T inserts a new entry for value $v_1$ into the B-tree index $I_B$. Before transaction T inserts the new entry for value $v_1$ into the B-tree index $I_B$, transaction T holds the two W locks for $d=v_1$ and $d=v_2$ on AJV. During this period, no other transaction T" can insert an entry for value $v_3$ into the B-tree index $I_B$ such that $v_1 \leq v_3 \leq v_2$. This is because to do so, transaction T" needs to get a W (or X) lock for $d=v_2$ on AJV. Then during this period, transaction T' cannot get the S value lock for $d=v_1$ on the B-tree index $I_B$ of AJV. This is because to do so, transaction T' needs to get an S lock for $d=v_2$ on AJV. After transaction T inserts the new entry for value $v_1$ into the B-tree index $I_B$, transaction T will hold a Y (or W) lock for $d=v_1$ on AJV until transaction T finishes execution. Then during this period, transaction T' still cannot get the S value lock for $d=v_1$ on the B-tree index $I_B$ of AJV. This is because to do so, transaction T' needs to get an S lock for $d=v_1$ on AJV.

(c) Transaction T gets the X value lock for $d=v_1$ on the B-tree index $I_B$ of AJV first. Thus, transaction T puts an X lock for $d=v_1$ and another X lock for $d=v_2$ on AJV. During the period that transaction T holds the two X locks for $d=v_1$ and $d=v_2$ on AJV, no other transaction T" can insert an entry for value $v_3$ into the B-tree index $I_B$ such that $v_1 \leq v_3 < v_2$. This is because to do so, transaction T" needs to get a W (or X) lock for $d=v_2$ on AJV. Then during the period that transaction T holds the two X locks for $d=v_1$ and $d=v_2$ on AJV, transaction T' cannot get the S value lock for $d=v_1$ on the B-tree index $I_B$ of AJV. This is because to do so, depending on whether transaction T has inserted a new entry for value $v_1$ into the B-tree index $I_B$ or not, transaction T' needs to get an S lock for either $d=v_1$ or $d=v_2$ on AJV.

In the above three scenarios, the situation that transaction T itself inserts an entry for value $v_3$ into the B-tree index $I_B$ such that $v_1 \leq v_3 < v_2$ can be discussed in a way similar to Case 3.

Thus, for any value $v_1$, there is no read-write or write-read conflict between two different transactions on those tuples of the aggregate join view AJV whose attribute d has value $v_1$.

As discussed in Section III, if a B-tree index is not used, then W locks are only used on aggregate join views, not on join views. That is, without a B-tree index, only S, X, and Y value locks are used on join views. However, the situation changes in the presence of a B-tree index. Suppose S, X, and Y value locks (but not a W lock) are implemented for join views on B-tree indices. Also, suppose a B-tree index is built on attribute a of a join view JV. Then to insert a new join result tuple t into the join view JV, a Y value lock for t.a is first placed on the B-tree index. If no entry for t.a exists in the B-tree index, the database system finds the smallest value $v_2$ in the B-tree index such that $v_2 > t.a$ and places an X lock for value $v_2$ on the B-tree index. Unlike the W lock, the X lock for value $v_2$ on the B-tree index cannot be downgraded to a Y lock. Thus, this X lock greatly reduces concurrency. However, the X lock for value $v_2$ on the B-tree index cannot be replaced by a Y lock.

To illustrate why, the following example is provided. Suppose the schema of the join view JV is (a, b), and a B-tree index is built on attribute a of the join view JV. Suppose originally the join view JV contains two tuples (1, 7) and (4, 8). Consider the following three transactions T, T', and T" on the join view JV. Transaction T inserts a new join result tuple (2, 5) into the join view JV. Transaction T' inserts a new join result tuple (3, 6) into the join view JV. Transaction T" reads those tuples whose attribute a is between 1 and 3. Suppose the X lock for value $v_2$ on the B-tree index is replaced by a Y lock. Also, suppose the three transactions T, T', and T" are executed in the following way.

Figures 37, 38:
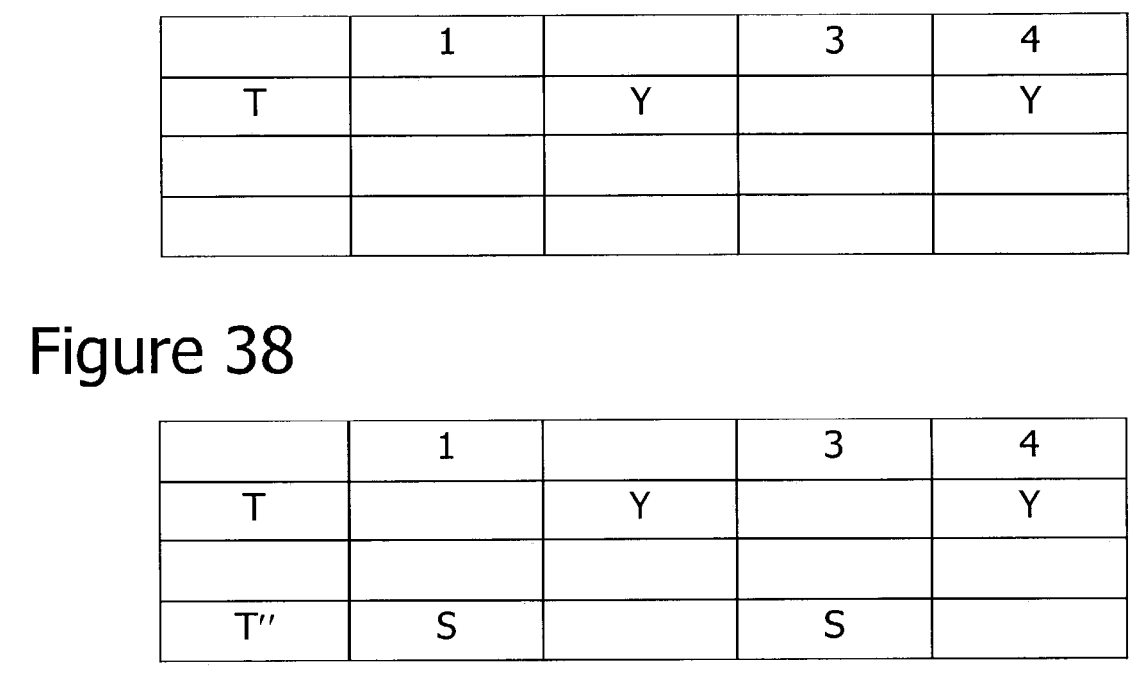

Transaction T places a Y lock for a=2 and another Y lock for a=4 on the join view JV, as illustrated in FIG. 34. Next, transaction T' finds the entries for a=1 and a=4 in the B-tree index. Transaction T' places a Y lock for a=3 and another Y lock for a=4 on the join view JV, as shown in FIG. 35. Transaction T' then inserts the tuple (3, 6) and an entry for a=3 into the join view JV and the B-tree index, respectively, as shown in FIG. 36. Next, transaction T' commits and releases the two Y locks for a=3 and a=4, as shown in FIG. 37. Before transaction T inserts the entry for a=2 into the B-tree index, transaction T" finds the entries for a=1, a=3, and a=4 in the B-tree index. Transaction T" places an S lock for a=1 and another S lock for a=3 on the join view JV, as shown in FIG. 38.

In this way, transaction T" can start execution even before transaction T finishes execution, which is incorrect, because there is a write-read conflict between transaction T and transaction T" (on the tuple (2, 6)).

To implement value locks for join views on B-tree indices with high concurrency, the W value lock mode is utilized and join views are treated in the same way as aggregate join views. For join views, the database system uses four kinds of value locks: S, X, Y, and W. For example, suppose a B-tree index is built on attribute a of a join view JV. To insert a new join result tuple t into the join view JV, a W value lock for t.a is placed on the join view. After the new join result tuple t and its row ID are inserted into the join view JV and the B-tree index, respectively, the W value lock for t.a is downgraded to a Y value lock. To delete a join result tuple t from the join view JV, a Y value lock for t.a is first placed on the join view. For join views, all the four different kinds of value locks (S, X, Y, and W) can be implemented on B-tree indices in the same way as described above.

Alternatively, the W value lock mode can be implemented on B-tree indices in a different way from that described above. For example, consider the case that no entry for value $v_1$ exists in the B-tree index. After an entry for value $v_1$ with an empty row ID list is inserted into the B-tree index, the W lock for value $v_1$ on the B-tree index can be downgraded to a Y lock immediately.

VI. System Environment

Instructions of the various software routines or modules discussed herein (such as the parsing engine, data server modules, lock managers, and so forth) are stored on one or more storage devices in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to each system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of maintaining consistency in a computer implemented database system comprising:
   storing a view that is based on one or more relations;
   storing a B-tree index for the view; and
   in response to a request to update one of the one or more base relations, placing a predefined first lock on the view,
   wherein the predefined first lock conflicts with either a shared lock or an exclusive lock placed on the view but does not conflict with another predefined first lock placed on the view.

2. The method of claim 1, further comprising performing key range locking on the view in response the B-tree index being present.

3. The method of claim 2, wherein the request specifies an update of a row with a first value of an attribute, the method further comprising:
   determining if the first value of an attribute is present in the B-tree index,
   wherein the key range locking is performed in response to determining that the first value of the attribute is not in the B-tree index.

4. The method of claim 3, wherein performing key range locking comprises placing an excusive lock on a second value of the attribute instead of placing the predefined first lock.

5. The method of claim 1, further comprising receiving another request that specifies a read and write of a row containing a first value of an attribute; and
   performing key range locking for the another request by placing a first exclusive lock on the first value of the attribute and placing a second exclusive lock on a second value of the attribute.

6. The method of claim 5, wherein performing the key range locking comprises performing next key locking, and wherein placing the second exclusive lock on the second value of the attribute comprises placing the second exclusive lock on a smallest value of the attribute present in the B-tree index that is greater than the first value.

7. The method of claim 5, wherein performing the key range locking comprises performing previous key locking, and wherein placing the second exclusive lock on the second value of the attribute comprises placing the second exclusive lock on a largest value of the attribute present in the B-tree index that is smaller than the first value.

8. The method of claim 1, further comprising:
in response to the request, performing a fetch operation of the view to find a row containing a first value of an attribute;
in response to determining that the first value of the attribute is present in the B-tree index, placing a shared lock for the fetch operation on the first value of the attribute on the view; and
in response to determining that the first value of the attribute is not present in the B-tree index, placing a shared lock for the fetch operation on a second value of the attribute on the view.

9. The method of claim 1, further comprising:
receiving a second request that causes a row with a first value of an attribute to be integrated into the view;
in response to the second request, placing a first predefined second lock on the first value of the view if the first value of the attribute is present in the B-tree index, wherein the predefined second lock conflicts with any of one of a shared lock, exclusive lock, and another predefined second lock placed on the view, but not conflicting with the predefined first lock on the view; and
in response to the second request, placing a second predefined second lock on a second value of the attribute on the view if the first value of the attribute is not present in the B-tree index.

10. The method of claim 1, wherein storing the view comprises storing one of a join view and an aggregate join view.

11. The method of claim 1, wherein the request to update comprises a delete request, the method further comprising performing logical deletion of a corresponding first entry in the B-tree index in response to the delete request.

12. The method of claim 11, wherein the delete request is part of a first transaction, the method further comprising:
in a second, subsequent transaction, performing a physical deletion of the first entry.

13. The method of claim 12, wherein performing logical deletion of the first entry comprises setting a flag to indicate future deletion, wherein performing the physical deletion in the second transaction is in response to the flag of the first entry being set.

14. The method of claim 13, wherein performing the physical deletion is allowed only if the second transaction does not place a lock on a value of an attribute corresponding to the first entry.

15. The method of claim 14, wherein the first entry comprises an entry in one plural leaf nodes of the B-tree index.

16. An article comprising at least one storage medium containing instructions that when execute cause a computer database system to:
store a view based on one or more base relations;
store a B-tree index for the view; and
in response to a request to update a row containing a first value of an attribute in one of the one or more base relations, placing a predefined first lock on the view if an entry corresponding to the first value of the attribute is present in the B-tree index,
wherein the predefined first lock conflicts with either a shared lock or an exclusive lock placed on the view but does not conflict with another predefined first lock placed on the view.

17. The article of claim 16, wherein the instructions when executed cause the database system to further perform key range locking on the view in response to detecting that the entry corresponding to the first value of the attribute is not present in the B-tree index.

18. The article of claim 17, wherein the instructions when executed cause the database system to perform key range locking by placing an exclusive lock on a second value of the attribute instead of placing the predefined first lock on the view.

19. The article of claim 18, wherein placing the exclusive lock on the second value of the attribute comprises placing the exclusive lock on a smallest value of the attribute that is larger than the first value, the key range locking comprising next key locking.

20. The article of claim 18, wherein placing the exclusive lock on the second value of the attribute comprises placing the exclusive lock on a largest value of the attribute that is smaller than the first value, the key range locking comprising previous key locking.

21. The article of claim 16, wherein the instructions when executed cause the database system to further:
receive another request that specifies a read and write of a row containing a second value of an attribute; and
perform key range locking for the another request by placing a first exclusive lock on the second value of an attribute and placing a second exclusive lock on a third value of an attribute.

22. The article of claim 16, wherein the instructions when executed cause the database system to further:
in response to the request, perform a fetch operation of the view to find a row containing the first value of the attribute;
in response to determining that the entry corresponding to the first value of the attribute is present in the B-tree index, place a shared lock for the fetch operation on the first value of the attribute on the view; and
in response to determining that the entry corresponding to the first value of the attribute is not present in the B-tree index, place a shared lock for the fetch operation on a second value of the attribute on the view.

23. The article of claim 16, wherein the instructions when executed cause the database system to further:
receive a second request that causes a row with a second value of an attribute to be integrated into the view;
in response to the second request, placing a first predefined second lock on the second value on the view if the second value of the attribute is present in the B-tree index,
wherein the predefined second lock conflicts with any of one of a shared lock, exclusive lock, and another predefined second lock placed on the view, but not conflicting with the predefined first lock on the view; and
in response to the second request, placing a second predefined second lock on a third value of the attribute on the view if the second value of the attribute is not present in the B-tree index.

24. The article of claim 16, wherein the request to update comprises a delete request, wherein the instructions when executed cause the database system to further perform logical deletion of a corresponding first entry in the B-tree index in response to the delete request.

25. The article of claim 24, wherein the delete request is part of a first transaction, wherein the instructions when executed cause the database system to further in a second, subsequent transaction, perform a physical deletion of the first entry.

26. The article of claim 25, wherein performing logical deletion of the first entry comprises setting a flag to indicate future deletion, wherein performing the physical deletion in the second transaction is in response to the flag of the first entry being set.

27. The article of claim 26, wherein performing the physical deletion is allowed only if the second transaction does not place a lock on a value of an attribute corresponding to the first entry.

28. A computer implemented database system comprising:
- a storage module to store one or more base relations, a view based on the one or more base relations, and a B-tree index for the view; and
- a database management controller adapted to place a predefined lock on the view in response to a first request that updates a row containing a first value of an attribute in the view if an entry corresponding to the first value of the attribute exists in the B-tree index, wherein the predefined lock conflicts with either an exclusive lock or shared lock on the view, but does not conflicting conflict with another modified-exclusive lock on the view.

29. The computer implemented database system of claim 28, wherein the database management controller comprises plural data server modules that are part of a parallel database system,
- the plural data server modules to concurrently manage access of plural portions of each of the one or more base relations, the view, and the B-tree index.

30. The computer implemented database system of claim 28, wherein the database management controller is adapted to further perform key range locking on the view in response to detecting that the entry corresponding to the first value of the attribute is not present in the B-tree index.

31. The computer implemented database system of claim 30, wherein the database management controller is adapted to further perform key range locking by placing an exclusive lock on a second value of the attribute instead of placing the predefined first lock on the view.

32. The computer implemented database system of claim 28, wherein the database management controller is adapted to further:
- receive another request that specifies a read and write of a row containing a second value of an attribute; and
- perform key range locking for another request by placing a first exclusive lock on the second value of the attribute and placing a second exclusive lock on a third value of the attribute.

33. The computer implemented database system of claim 28, wherein the database management controller is adapted to further:
- in response to the request, perform a fetch operation of the view to find a row containing the first value of the attribute;
- in response to determining that the entry corresponding to the first value of the attribute is present in the B-tree index, place a shared lock for the fetch operation on the first value of the attribute on the view; and
- in response to determining that the entry corresponding to the first value of the attribute is not present in the B-tree index, place a shared lock for the fetch operation on a second value of the attribute on the view.

34. The computer implemented database system of claim 28, wherein the database management controller is adapted to further:
- receive a second request that causes a row with a second value of an attribute to be integrated into the view;
- in response to the second request, placing a first predefined second lock on the second value on the view if the second value of the attribute is present in the B-tree index, wherein the predefined second lock conflicts with any of one of a shared lock, exclusive lock, and another predefined second lock placed on the view, but not conflicting with the predefined first lock on the view; and
- in response to the second request, placing a second predefined second lock on a third value of the attribute on the view if the second value of the attribute is not present in the B-tree index.

35. The computer implemented database system of claim 28, wherein the request to update comprises a delete request, and wherein the database management controller is adapted to further perform logical deletion of a corresponding first entry on the B-tree index in response to the delete request.

36. The computer implemented database system of claim 35, wherein the delete request is part of the first transaction, and wherein the database management controller is adapted to further:
- in a second, subsequent transaction, perform a physical deletion of the first entry.

* * * * *

UNITED STATES PATENT AND TRADEMARK OFFICE
CERTIFICATE OF CORRECTION

PATENT NO. : 7,174,331 B1 Page 1 of 1
APPLICATION NO. : 10/349855
DATED : February 6, 2007
INVENTOR(S) : G. Luo, M.W. Watzke, C.J. Ellmann and J.F. Naughton It is certified that error appears in the above-identified patent and that said Letters Patent is hereby corrected as shown below:

Column 28, Line 45, after "an" delete "excusive" and insert --exclusive--

Signed and Sealed this

Sixth Day of November, 2007

JON W. DUDAS
*Director of the United States Patent and Trademark Office*